United States Patent [19]
Seligson

[11] Patent Number: 5,473,731
[45] Date of Patent: Dec. 5, 1995

[54] LATTICE BASED DYNAMIC PROGRAMMING CLASSIFICATION SYSTEM

[75] Inventor: Daniel Seligson, Palo Alto, Calif.

[73] Assignee: Intel Corporation, Santa Clara, Calif.

[21] Appl. No.: 94,468

[22] Filed: Jul. 20, 1993

[51] Int. Cl.⁶ .................................................. G06F 15/18
[52] U.S. Cl. ............................... 395/27; 395/22; 395/23; 395/24; 395/11
[58] Field of Search .................................. 395/27, 24, 23, 395/11, 22; 364/807

[56] References Cited

U.S. PATENT DOCUMENTS

| | | | |
|---|---|---|---|
| 4,254,474 | 3/1981 | Cooper et al. | 395/27 |
| 4,560,977 | 12/1985 | Murakami et al. | 364/807 |
| 4,670,851 | 6/1987 | Murakami et al. | 364/807 |
| 4,887,151 | 12/1989 | Wataya | 358/80 |
| 4,926,180 | 5/1990 | Anastassiou | 395/27 |
| 4,972,483 | 11/1990 | Cary | 381/31 |
| 4,989,249 | 1/1991 | Oka et al. | 381/43 |
| 4,992,889 | 2/1991 | Yamagami et al. | 358/430 |
| 5,016,278 | 5/1991 | Rochette et al. | 381/36 |
| 5,063,521 | 11/1991 | Peterson et al. | 395/27 |
| 5,091,864 | 2/1992 | Baji et al. | 395/27 |
| 5,097,141 | 3/1992 | Leivian et al. | 395/27 |
| 5,129,002 | 7/1992 | Tsuboka | 381/43 |
| 5,138,695 | 8/1992 | Means et al. | 395/27 |
| 5,150,209 | 9/1992 | Baker et al. | 358/133 |
| 5,155,594 | 10/1992 | Bernstein et al. | 358/136 |
| 5,165,010 | 11/1992 | Masuda et al. | 395/27 |
| 5,253,330 | 8/1993 | Ramacher et al. | 395/27 |
| 5,271,089 | 12/1993 | Ozawa | 395/2.31 |
| 5,274,746 | 12/1993 | Mashiko | 395/27 |
| 5,276,772 | 1/1994 | Wang et al. | 395/27 |
| 5,297,170 | 3/1994 | Eyuboglu et al. | 375/25 |
| 5,341,441 | 8/1994 | Maeda et al. | 382/56 |

OTHER PUBLICATIONS

H. Sakoe, R. Isotani, K. Yoshida, K. Iso, and T. Watanabe, "Speaker–Independent Word Recognition Using Dynamic Programming Neural Networks," *International Conference on Acoustics, Speech and Signal Processing*, 1989, vol. 1, pp. 29–32.

C. C. Tapperrt, "Cursive Script Recognition by Elastic Matching," *IBM J. Res. Develop.*, vol. 26, No. 6, Nov. 1982, pp. 79–85.

*Primary Examiner*—George B. Davis
*Attorney, Agent, or Firm*—Blakely, Sokoloff, Taylor & Zafman

[57] ABSTRACT

An integrated circuit lattice chip for computation of dynamic programming (DP) recursions uses identical nodal processor units arranged in regular lattice form. Interconnections between processor units on the chip are programmable using non-volatile EEPROM connections. The nodal processor units have computing element for generating a distance metric representative of the difference between the $i^{th}$ and $j^{th}$ elements of the unknown and prototype vectors that is combined with a maximum partial or minimum cumulative distance metric of preselected set of lower order nodal processors to produce an optimal (maximum or minimum) cumulative distance value for unknown and prototype vector elements with indices equal to or less than (i, j). A network is also provided for identifying the optimal path through the lattice for use in designing a DP classification system.

25 Claims, 17 Drawing Sheets

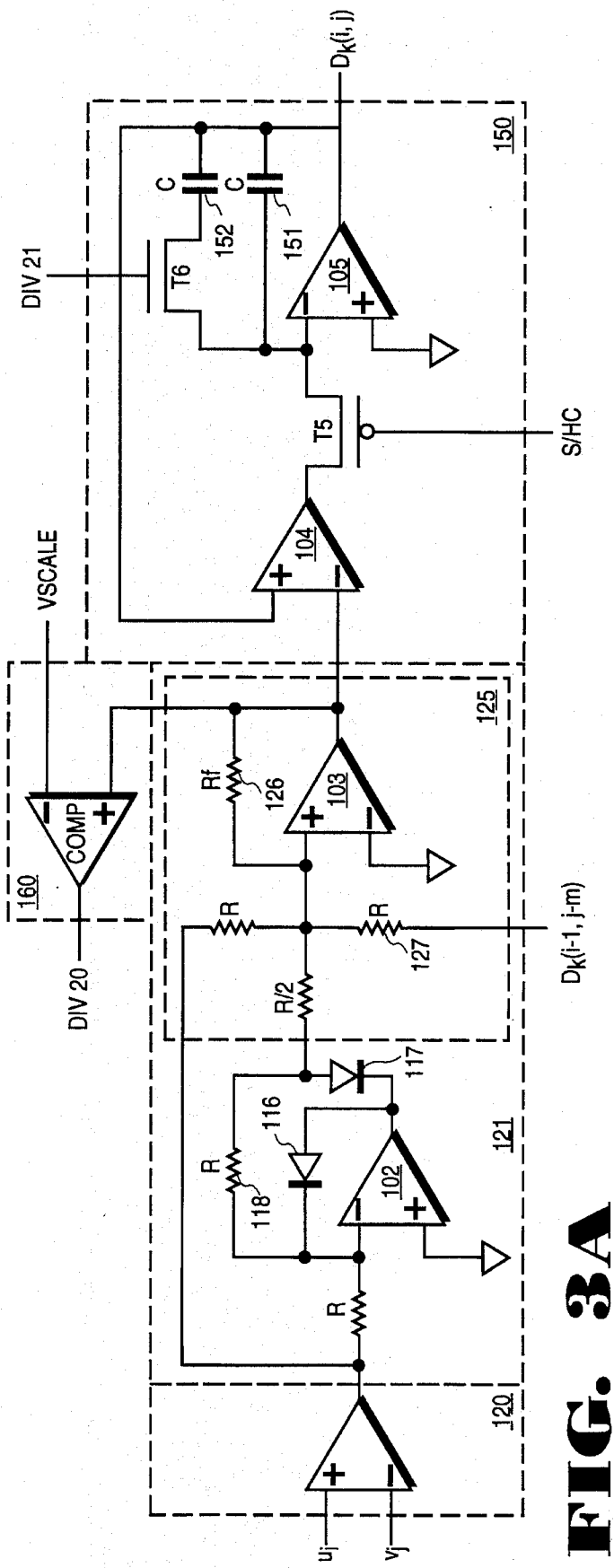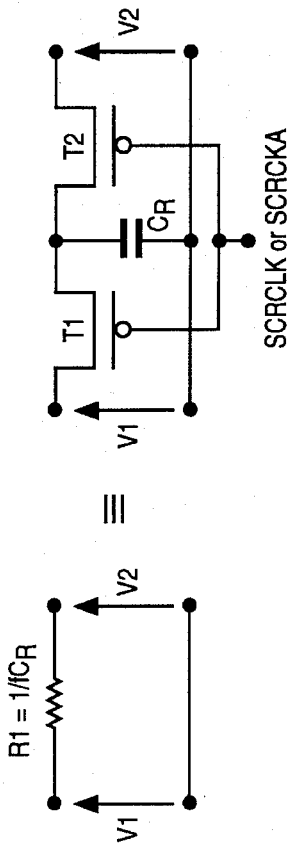
FIG. 3A
FIG. 3B

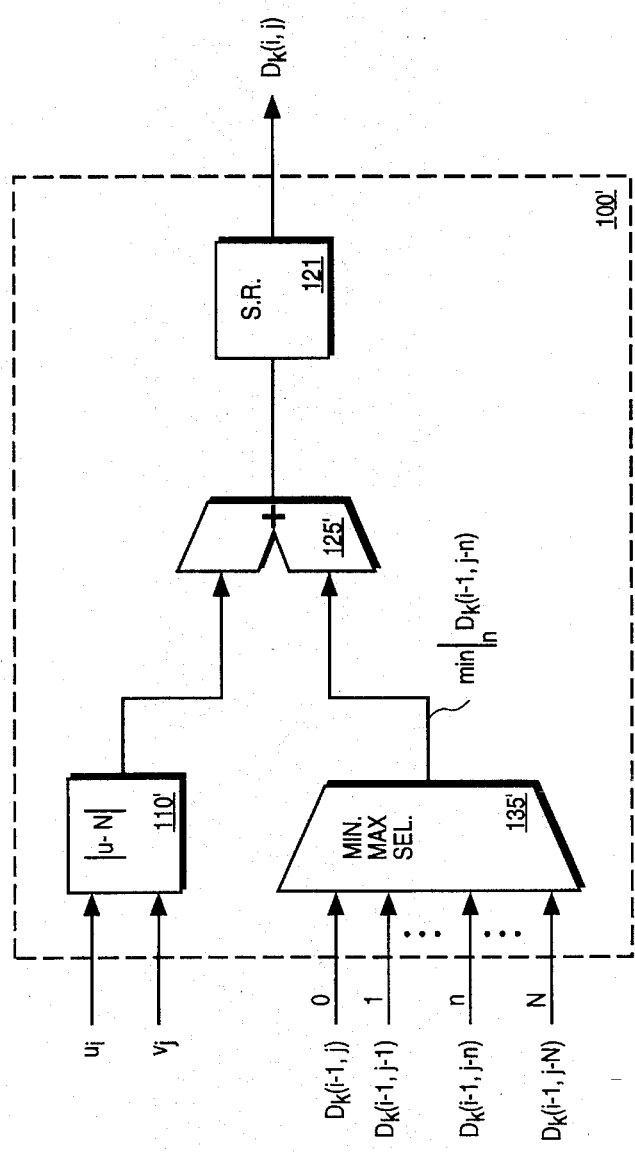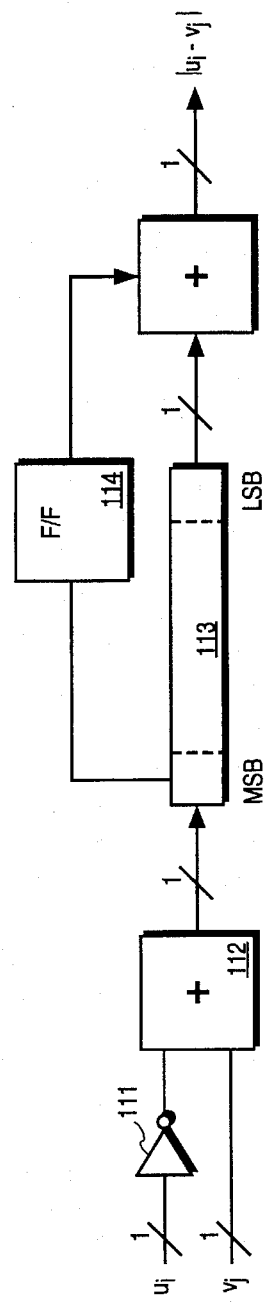
FIG. 8
FIG. 9

| | COLUMN | | | |
|---|---|---|---|---|
| | j = 0 | 1 | 2 | 3 |
| 0 | 0 | | | |
| 1 | 0 | 1 | | |
| 2 | 0 | 1 | 2 | |
| 3 | 0 | 1 | 2 | 3 |
| 4 | 4 | 1 | 2 | 3 |
| 5 | 4 | 5 | 2 | 3 |
| 6 | 4 | 5 | 6 | 3 |
| 7 | 4 | 5 | 6 | 7 |
| 8 | 8 | 5 | 6 | 7 |
| 9 | 8 | 9 | 6 | 7 |
| 10 | 8 | 9 | 10 | 7 |
| 11 | 8 | 9 | 10 | 11 |
| 12 | 12 | 9 | 10 | 11 |
| 13 | 12 | 13 | 10 | 11 |
| 14 | 12 | 13 | 14 | 11 |
| 15 | 12 | 13 | 14 | 15 |

TIME INDEX n (rows) ← L = 4 →

LATTICE BASED DYNAMIC PROGRAMMING CLASSIFICATION SYSTEM

FIELD OF THE INVENTION

The present invention relates to a signal classification apparatus and more specifically to classifiers using lattice-based dynamic programming techniques.

BACKGROUND OF THE INVENTION

Recursive dynamic programming (DP) techniques are used in many different and varied applications such as speech recognition and genetic sequence comparison. In both of these cases, and in many others, the unifying principle is optimization. In all cases, the execution of the optimizing equations is computationally intensive and in some cases so intensive that the DP method of solution is not practical except for research as, for example, in a speech recognition system wherein the computational burden prohibits real-time operation.

The DP recursive expressions have an inherent parallelism that is suitable for implementation on parallel computer structures. General purpose systolic processors, such as Intel's "iWarp", have been applied to the task. Also, fine grain parallel computing neural networks have been used to implement DP techniques for speech recognition (for example, "Speaker-Independent Word Recognition Using Dynamic Programming Neural Networks," Sakoe, H., Isotani, R., Yoshida, K., Iso, K., and Watanabe, T., International Conference on Acoustics, Speech and Signal Processing, 1989, Vol. 1, pp. 29–32).

A handwriting recognition algorithm described by C. C. Tappert in "Cursive Script Recognition by Elastic Matching", IBM J. Res. Develop. Vol. 26, No. 6, Nov. 1982, pp. 79–85, is based on DP methods and uses a recursive distance metric for comparing a vector element in an unknown script vector with various elements of a prototype script vector. The classification method uses elastic coding at the letter level, allows any letter to follow any letter, and finds the optimal letter sequence which uses all the data points of the input word. The decoder finds the sequence of prototype letters that best matches the input word. The optimal DP recursive relationship is of the form $$D_k(i,j) = d_k(i,j) + \min_{l} \{D_k(i-1, j-1)\} \quad (1)$$

where $D_k(i, j)$ is the cumulative minimum distance between point i in the unknown and point j in prototype k. The first term on the right hand side of equation (1), $d_k(i, j)$, is a local difference or distance metric that compares point i of the unknown with point j of the prototype k. The second additive term is the minimum of several possible cumulative distances computed on the previous columns of the lattice as determined by the range of the integer column (or elasticity) parameter, l. For the general, non-boundary case, Tappert assigned a range of l=0, 1, 2 which only involved the present (l=0) and the past two (l=1, 2) prototype data points. The range of l provides for continuity and elasticity (time-warp) in the comparison of the unknown and the prototype k.

Equation (1) is of sufficient generality that it is useful in classification procedures for a large variety of applications. The current invention relates to a classification system that uses a network lattice structure that allows for the efficient calculation of DP recursions using the form of equation (1).

BRIEF DESCRIPTION AND OBJECTS OF THE INVENTION

One object of the present invention is to provide a dynamic programmed classification system based on a novel large-scale integrated chip used for implementing the massively parallel computations required.

Another object is to provide an efficient large scale integrated lattice structure for DP recursion computations.

Another object is to provide for programmable internode connections that can be customized for particular recursive DP algorithms.

Another object is to provide for programmable path-dependent weights, such as probability weights, in the recursion computations.

Another object is to provide a DP recursion structure based on either maximization or minimization of an objective function.

Another object is to provide a local difference function representative of the conditional probability of the $j^{th}$ element of the prototype vector given the $i^{th}$ element of the unknown vector.

Another object is to provide a modular lattice large-scale integrated circuit for DP recursive computations that may be interconnected with other similar units to provide arbitrary large computational lattices.

Another object is to provide a lattice DP computational structure for comparing vectors of different magnitudes with pre-processing scaling operations.

Another object is to provide, to a host processor, the path of the optimal search represented by the coordinates of the selected candidate minimum cumulative distance metrics.

Another object is to provide automatic scaling of intermediate results for improved computing dynamic range.

Another object is to provide variable threshold control for the initiation of scaling of intermediate results.

An integrated lattice circuit for DP recursion computation is based on a structure using identical nodal processor units arranged in a regular lattice form. Interconnections between processor units on the chip are programmable using non-volatile EPROM connections. The nodal processor units comprise a difference circuit for producing a distance metric representative of the distance between the $i^{th}$ and $j^{th}$ elements of the unknown and prototype vectors, respectively and combining that distance metric with the smallest of a number of programmable preselected candidate cumulative distance metrics to produce the local, $(i, j)^{th}$, cumulative distance metric at its output.

A lattice-based classification system uses the DP recursion lattice chip, in conjunction with a suitable processor/controller, memory, and peripherals to form a complete classification system.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIGS. 3(a) and 3(b) are an analog absolute-magnitude difference circuit and summary unit.

FIG. 8 is a block diagram for a digital lattice node processing unit.

FIG. 9 is a block diagram for a digital serial absolute difference magnitude network.

DETAILED DESCRIPTION

A. General

The basic DP recursion expression to be implemented is $$D_k(i,j) = d_k(i,j) + \min/\max_l \{w(i-1,j-1) \cdot D_k(i-1,j-1)\}$$

where $D_k(i,j)$ is the cumulative distance between element $u_i$, in the unknown vector $u=(u, u_2, \ldots u_i, \ldots)^T$ and element $v_{kj}$ in the $k^{th}$ prototype vector $v_k=(v_k, v_{k2}, \ldots v_{kj}, \ldots)^T$, $d_k(i,j)$ is a local difference or distance metric between element $u_i$ and $V_{kj}$ and the last term on the right is the minimum or maximum of several cumulative distances corresponding to the $(i-1)^{th}$ element of u and the $(j-1)^{th}$ element of $v_k$ for all allowable values of the column displacement (elasticity) parameter, $l>0$.

Figure 1A:
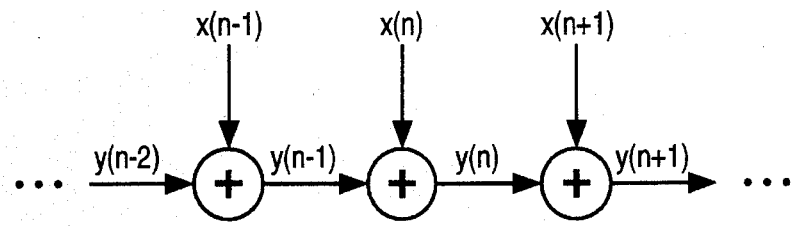
FIGS. 1(a) and 1(b) are a lattice flow diagram for computing the basic DP recursion calculation.

Simple one-dimensional recursions or iterations such as $$y(n)=x(n)+y(n-1) \quad (2)$$

may be represented as a one-dimensional sequence of operations as shown in FIG. 1(a). This representation implies that the $n^{th}$ sum of equation (2) may only be calculated after the previous sum, y(n−1), has been calculated. In this manner, the recursion process progresses to the right in time. If FIG. 1 (a) symbolizes a hardware structure of adder unit connected in tandem, the delay through each adder unit creates a pipelined processing system. Thus, a number of recursions may be processed simultaneously, each delayed by one unit of adder processing latency.

Figure 1B:
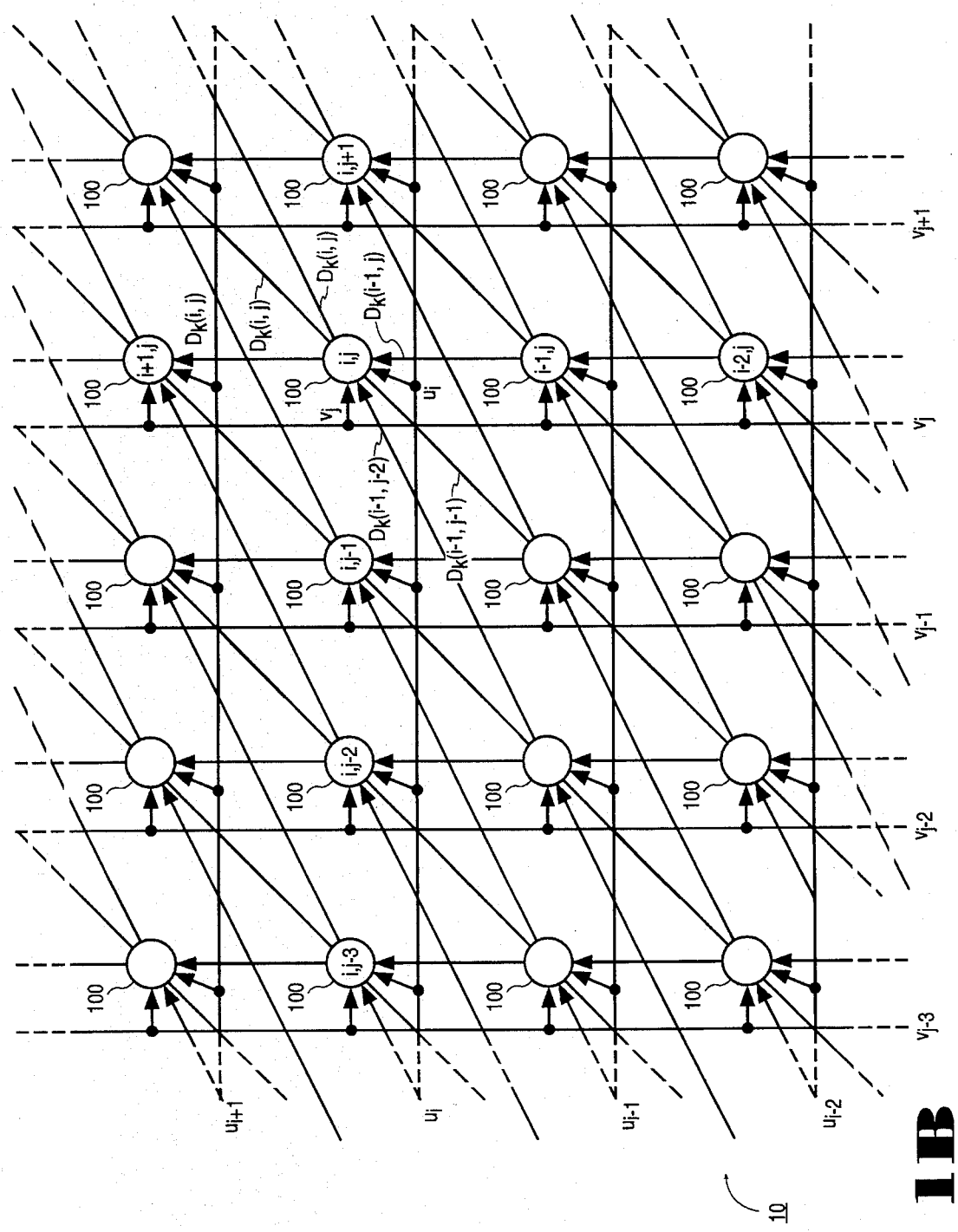

The DP recursion of equation (1) is a function of two indices, (i, j), and hence represents a two dimensional planar process as shown in FIG. 1(b). Each circular node represents a nodal processor 100 that accepts unknown vector components, $\{u_i\}$, along the horizontal rows and prototype vector components, $\{v_j\}$, along the vertical columns to form the local difference terms, $\{d_k(i,j)\}$. In addition, each nodal processor 100, such as shown at coordinates (i, j), is also connected to the output of prescribed neighboring nodal processors as indicated by $D_k(i-1,j)$, $D_k(i-1, j-1)$, and $D_k(i-1, j-2)$ for the purpose of selecting the minimum cumulative distance path for a given range in the elasticity parameter, 1.

Thus, if the unknown input vector u is presented to the set of horizontal data lines (i-dimension) at the left side of FIG. 1(b) and a prototype vector is applied to the vertical data lines (j-dimension), a partial cumulative distance wavefront represented by the values $\{D_k(m, j); m=0, 1, \ldots i \ldots\}$ would flow from left-to-right in a time-sequence determined by the processing latency of nodal processors 100. Pipelining of other prototype vectors may be introduced because those processors to the left of the wavefront that are beyond the range of the elasticity parameter, 1, are available to begin a new recursion with a different prototype vector.

Figure 2:
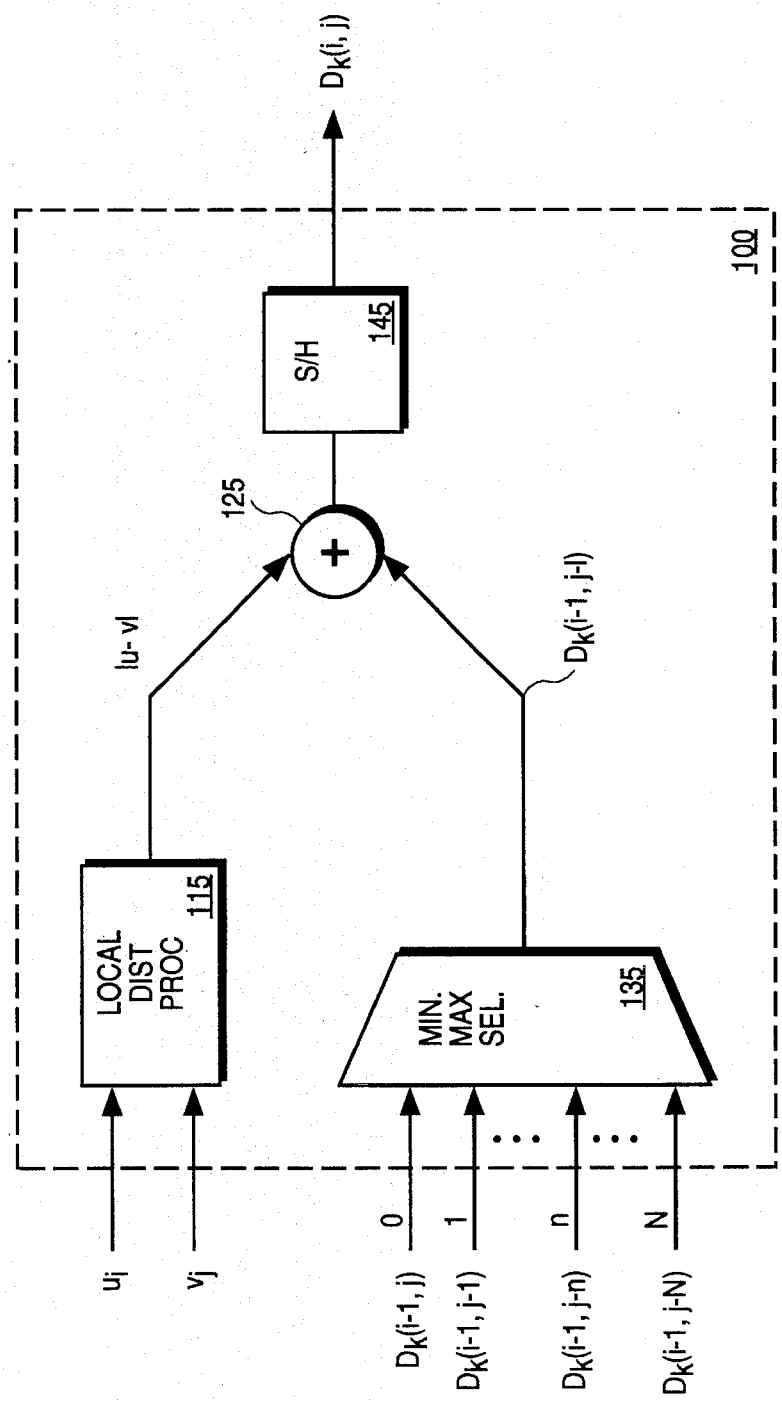
FIG. 2 is a simplified block diagram of a lattice node analog processing unit.

FIG. 2 is a simplified block diagram of an analog implemented nodal processor 100 such as used at coordinates (i, j) of FIG. 1(b). The two vector elements $u_i$ and $v_j$ are applied to a distance metric unit 115. The output of unit 115 may be any of the well-known distance metrics having the form $|u_i-v_j|^q$ where q>0. Preferred values are q=1 or 2 corresponding to the city-block (Manhattan) and quadratic (Euclidean) metric but other values including fractional non-integer values may be used. However, for the sake of clarity in presentation, the city-block (q=1) metric will be assumed in the following description.

Unit 135 is a minimum/maximum (min/max) selector network that accepts at its input terminals a set of prescribed partial cumulative distance values, $\{D_k(i-1, j-n); n=0, 1, \ldots, N\}$ obtained from "past" (n>0) and present (n=0) values of the wavefront. Unit 135 selects either the minimum partial cumulative distance value from the applied set as expressed in equation (1) or it may be used to select the maximum value of the applied set.

In other words, the iteration as expressed in equation (1) is for seeking a minimum cumulative distance between the unknown vector, u, and a prototype vector, $v_k$. This procedure represents an optimum DP minimization process. However, an optimum DP maximization process may be expressed by an equation similar in form to that of equation (1) as follows:

$$D_k(i,j) = d_k(i,j) + \max_l \{D_k(i-1,j-1)\} \quad (3)$$

where the last term on the right-side requires the selection of the term $D_k(i-1, j-1)$, that is the largest for all prescribed values of index 1. The form of equation (3) implies that the lattice structure required for implementing the DP maximization process is of the same form as for the DP minimization process. A further implication of equation (3) is that optional selection of either minimization or maximization may be provided at relatively small cost in the same structure, as described in the following section.

The output of local distance processor 115 and min/max selector 135 is summed by adder unit 125, yielding $D_k(i,j)$ which is temporarily stored in sample-and-hold (S/H) unit 145.

B. DP Lattice Nodal Processor Chip

FIG. 3(a) is an analog implementation of local distance processor 115, adder 125, and S/H 150. Distance processor 115 accepts $u_i$ and $v_j$ as input signal values that are applied to differential input amplifier 120 to form the difference $(u_i-v_j)$ which is then applied to absolute magnitude circuit 121 to form, at its output, a value representative of $|u_i-v_j|$. Absolute magnitude circuit 121 is a standard op-amp full-wave rectifier circuit using diodes 116 and 117 together with resistor 118 in a feedback circuit. All resistors labeled as R have the same value of resistance. The output of operational amplifier (op-amp) 102 is combined with the output of differential amplifier 120 by adder network 125 for forming the absolute value $|u_i-V_j|$. The absolute value is added to the value provided by min/max selector 135 at the input labeled $D_k(i-1, j-m)$ to produce an output signal representative of $D_k(i,j)$. The output of adder 125 is stored in S/H 150 by first asserting (high) input terminal S/HC and then de-asserting (low) input terminal S/HC. The stored value is retained for use by the following stages of computation and when no longer required is ready to store a new value. Details of the operation of circuits 120, 121, 125 and 150 are well-known in the analog circuit art and may be found in standard texts and references such as "Operational Amplifier Characteristics and Applications", Second Edition, Irvine, R. G., Prentice-Hall, Inc., Englewood Cliffs, N.J. 1987.

Because the direct integrated circuit implementation of resistors, such as shown in FIG. 3(a), are costly with respect to chip-area utilization, it is preferred that all resistors be implemented using switched-capacitor resistor (SCR) techniques as shown a FIG. 3(b).

A resistor with value R is synthesized by the switched capacitor $C_R$ when field effect transistors T1 and T2 are alternately turned off and on by the 50% duty cycle clock SCRCLK (or SCRCKA) signal applied to the gates of T1 and T2. This alternating cycling of T1 and T2 controls the amount of charge (and hence current) flowing into and out of capacitor $C_R$ due to the application of voltage V1 and clock signal SCRCLK. The value of effective resistance, thus created, is equal to $1/fC_R$ where f is the frequency of the 50% duty cycle clock. SCRCLK is used to create fixed switched capacitor resistors while SCRCKA has a different rate for synthesizing a resistor of different value.

Figure 4:
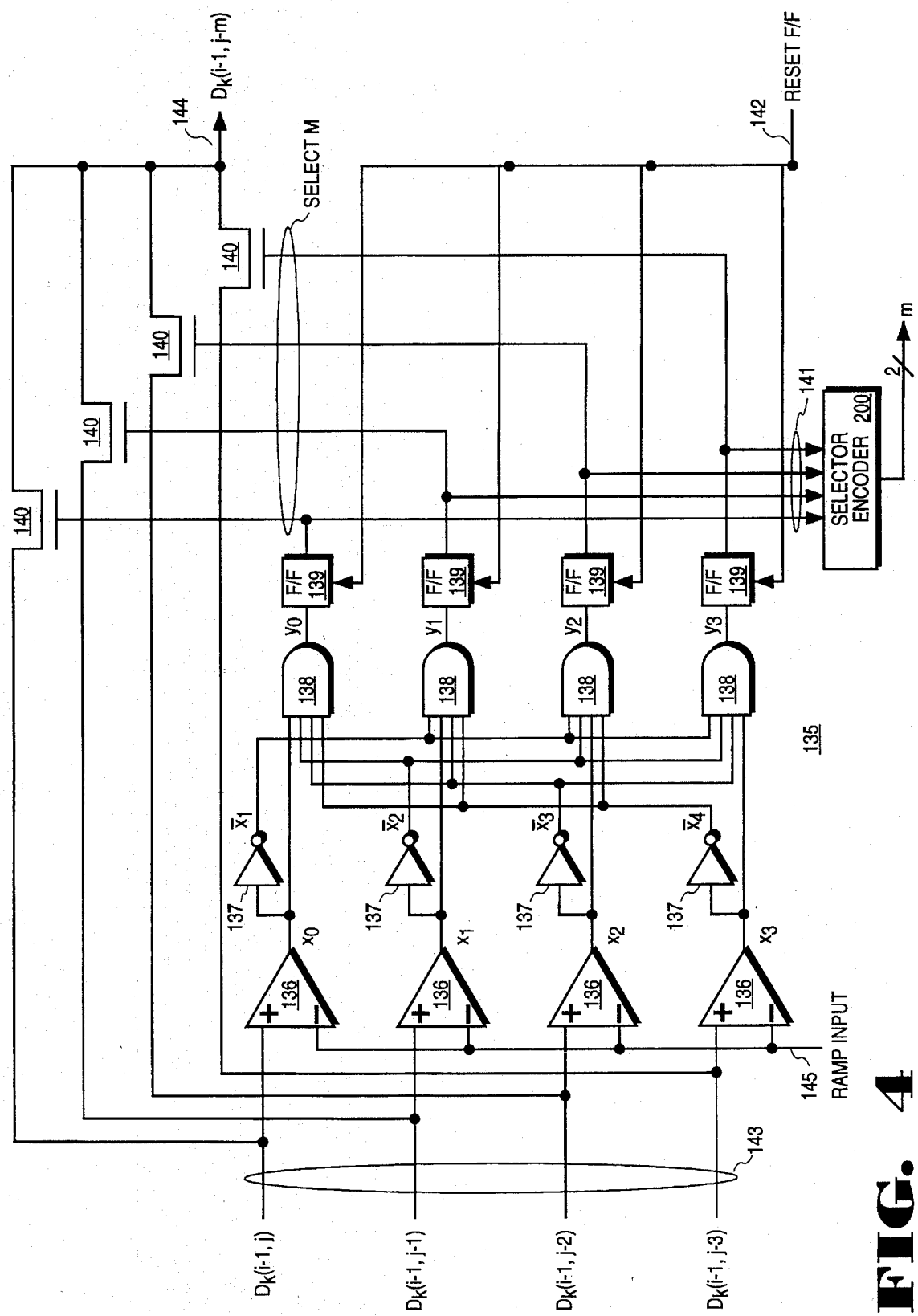
FIG. 4 is a minimum/maximum selector network for an analog lattice node processing unit.

FIG. 4 is a logic diagram of the min/max selector 135 configured to operate in the maximum detection mode. The selector accepts a set of candidate partial cumulative sum terms, $\{D_k(i-1, j-1)\}$ from which the minimum or maximum value is to be selected and passed-on for summing with the local distance value, $d_k(i, j)=|u_i-v_j|$, by adder 125 of FIG. 3(a). FIG. 4 shows a four-input configuration. Any particular implementation may use more or less inputs. However, the specific configuration in FIG. 4 is adequate for describing the general case.

The input cumulative distance values are applied to input terminals 143 and then compared with an analog ramp provided at input 145. The input values, $\{D_k(i-1, j-1)\}$, are all positive values and the ramp waveform applied to input 145 covers the expected range of the cumulative input values. Comparators 136 compare each input value with the common ramp value so that when the ramp value is less than the cumulative distance value to which it is being compared, the output of comparator 136 is high. When the ramp value is greater than the cumulative value being compared, the output of comparator 136 is low. Because all cumulative input values are equal to or greater than zero, the rising ramp waveform will eventually equal or exceed all cumulative values except the highest. At that point, the comparator having the highest cumulative input value $\{D_k(i-1, j-m)\}=$ maximum of $\{D_k(i-1, j-1)\}$ with respect to 1) will have a high output while the others will have a low output. Thus, the detection of a single logical high output indicates the input terminal associated with the high output comparator has the maximum cumulative distance input value.

The above described combination of comparator 136 with one input being a ramp and the other an input data signal is equivalent to a pulse width modulator (PWM) that converts the input signal level to a binary valued signal with a pulse width proportional to the input signal value.

The logic network comprising the four inverters 137 and the four 4-input AND-gates 138 implement the following Boolean equation:

$$y_0 = \bar{x}_0 \cdot \bar{x}_1 \cdot \bar{s}_2 \cdot \bar{x}_3$$

$$y_1 = \bar{x}_0 \cdot x_1 \cdot \bar{x}_2 \cdot \bar{x}_3$$

$$y_2 = \bar{x}_0 \cdot \bar{x}_1 \cdot x_2 \cdot \bar{x}_3$$

$$y_3 = \bar{x}_0 \cdot \bar{x}_1 \cdot \bar{x}_2 \cdot x_3 \qquad (4)$$

In general, $Y_i=1$ only if $x_i=1$ and $x_m=0$ for all $m \neq 1$. This ensures that only one-out-four of the outputs of AND-gates 138 are active (high), while all other outputs are low. The high output, corresponding to the maximum input value, sets the associated flip-flop (F/F) 139 to high when it transitions from low to high and remains high until reset when RESET F/F is asserted on control line 142. The high F/F 139 output controls a corresponding field effect transistor that gates the selected $D_k(i-1, j-m)$ input to output terminal 144 that is connected to the summing input terminal of adder 125 of FIG. 3(a), causing the sum $D_k(i,j)=d_k(i,j)+D_k(i-1,j-m)$ to be formed at its output and stored in S/H 150.

The maximum selector network of FIG. 4 may be changed to a minimum selector network by connecting the ramp input to the (+) input of comparators 136 and the candidate input cumulative distance values to the (−) input of comparators 136.

Figure 5:
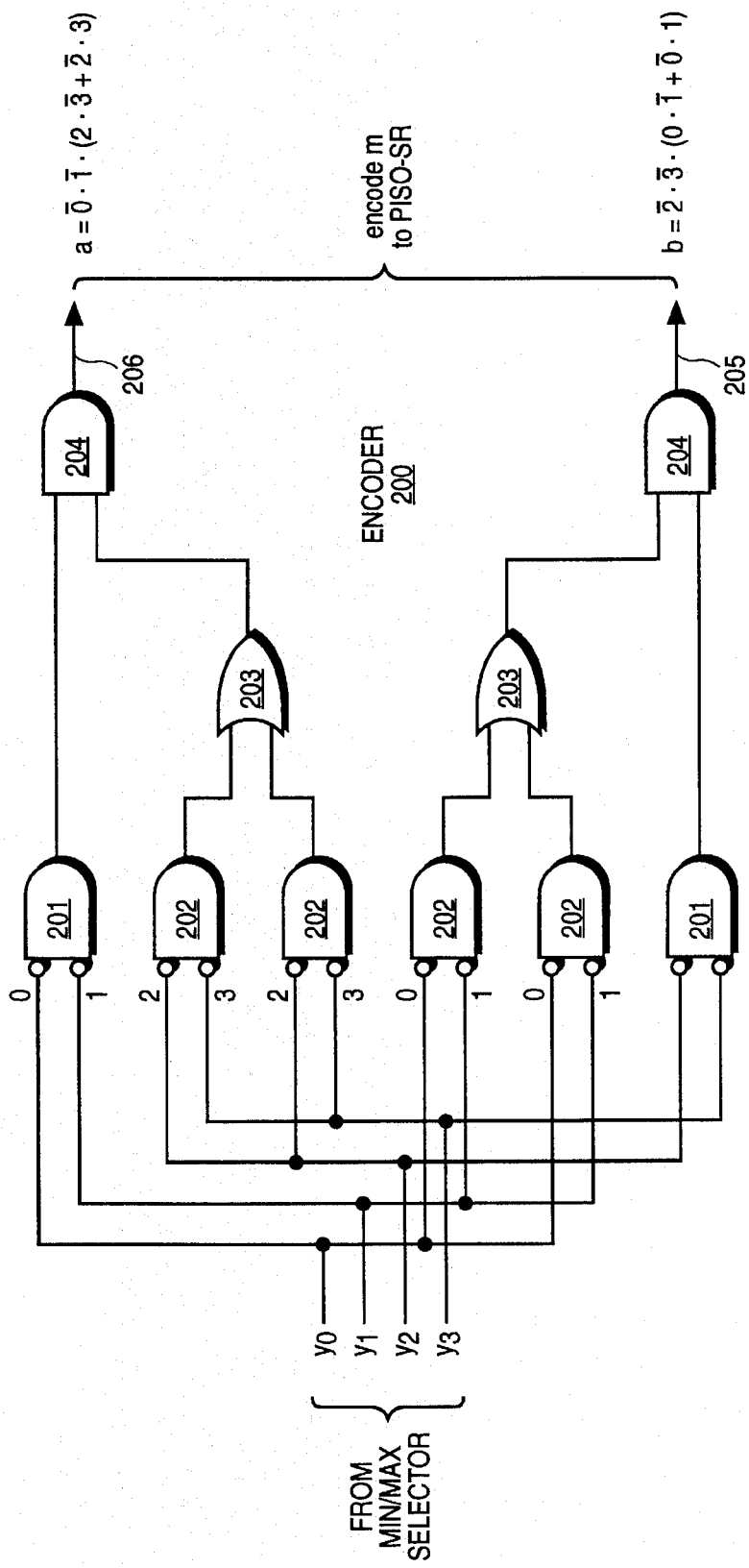
FIG. 5 is a logic diagram for encoding the selected input, minimum/maximum index (j−1), and for generating a detection complete signal.

The output of F/Fs 139 are also used to establish a record of the path of minimums or maximums selected by the lattice. The output lines 141 are applied to the input path trace encoder 200 shown in FIG. 5 for the purpose of generating a binary coded value representing the input cumulative value selected as the maximum or minimum value. The logic network of encoder 200 implements the following Boolean equations:

$$a = \bar{y}_0 \cdot \bar{y}_1 \cdot (y_2 \cdot \bar{y}_3 + \bar{y}_2 \cdot y_3)$$

$$b = \bar{y}_2 \cdot \bar{y}_3 \cdot (Y_0 \quad \bar{y}_1 + \bar{y}_0 \cdot y_1) \qquad (5)$$

where the pair (a, b) is the most-significant-bit and least significant, respectively.

The binary coded output, (a, b), is then latched into two-bits of a parallel-in serial-out shift-register (PISO-SR) providing 2-bits per node processor for each column of the lattice so that when the string of bits stored in the PISO-SR are read-out serially, the optimum path taken to each node of the column may be determined by noting, for each node, the input terminal of selector 135 that was selected. The complete path may then be generated by comparing the selector input nodes with the known lattice topography.

Scaling of cumulative values may be desirable in order to minimize the effects of circuit noise and to avoid saturation. Scaling must be applied equally to both terms of the right-hand side of equation (1), corresponding to the output of local distance processor 115 and the output of min/max selector 135 either before combining the two terms in adder 125, or during, or after the computation of the sum in adder 125.

Because the partial cumulative distance term, $D_k(i-1, j-1)$, involves a number of prior values ($1=0, 1, 2, \ldots$), the scaling is most efficiently accommodated by scaling the output of min/max selector 135. The scaling may be introduced by changing the ratio of $R_s/R$ in adder current 125 of FIG. 3(a). If, for example, resistor 126 is halved, both right-hand terms of equation (1) will be scaled by a factor of ½.

However, if half-scaling is introduced in the $j^{th}$ column producing a set of outputs, $\{½D_k(i,j)\}$ for $i=0, 1, 2, \ldots$, all subsequent (j+m, m=l, 2, ...) processing nodes whose cumulative distance depends on the scaled partial cumulatives, $\{½D_k(i,j)\}$, must compare equally scaled partial cumulatives $\{½D_k(i,j+m-1)\}$ at the input of their min/max selector 135. Also, each subsequent local distance term $d_k(i,j+m)$, must be scaled by the same factor.

Because of the elasticity parameter, 1, the processors in column j could receive unscaled partials cumulatives, $\{D_k(i-1, j-1), j\geq 1\}$ and a scaled partial cumulative, $D_k(i-1,j)$. Similarly, the next, (j+l), column would receive only two scaled partial cumulative terms, $\{D_k(i-1,j+1), D_k(i-1, j)\}$ while the remainder (older) partial cumulatives would be unscaled.

In order to reduce the complexity of the controller required to keep track of partial cumulatives, rescaling of all past partial cumulatives that fall within the latency range of the elasticity parameter, 1, should be rescaled at their originating node processor. This could be accomplished by recalculating the partial cumulatives in the preceding columns spanned by the range of 1. The recalculation may be done by scaling both unknown vector, u, and prototype vector, v, and recomputing all prior computing, or simply by scaling the output of the S/H network 145 of all nodes spanned by parameter 1. In the latter case, scale factors for vectors components $\{u_i, v_q; q \geq j\}$ must also be introduced.

Scaling factors of two are preferred because they may be readily implemented by binary logic and switched-capacitor techniques.

Figure 6:
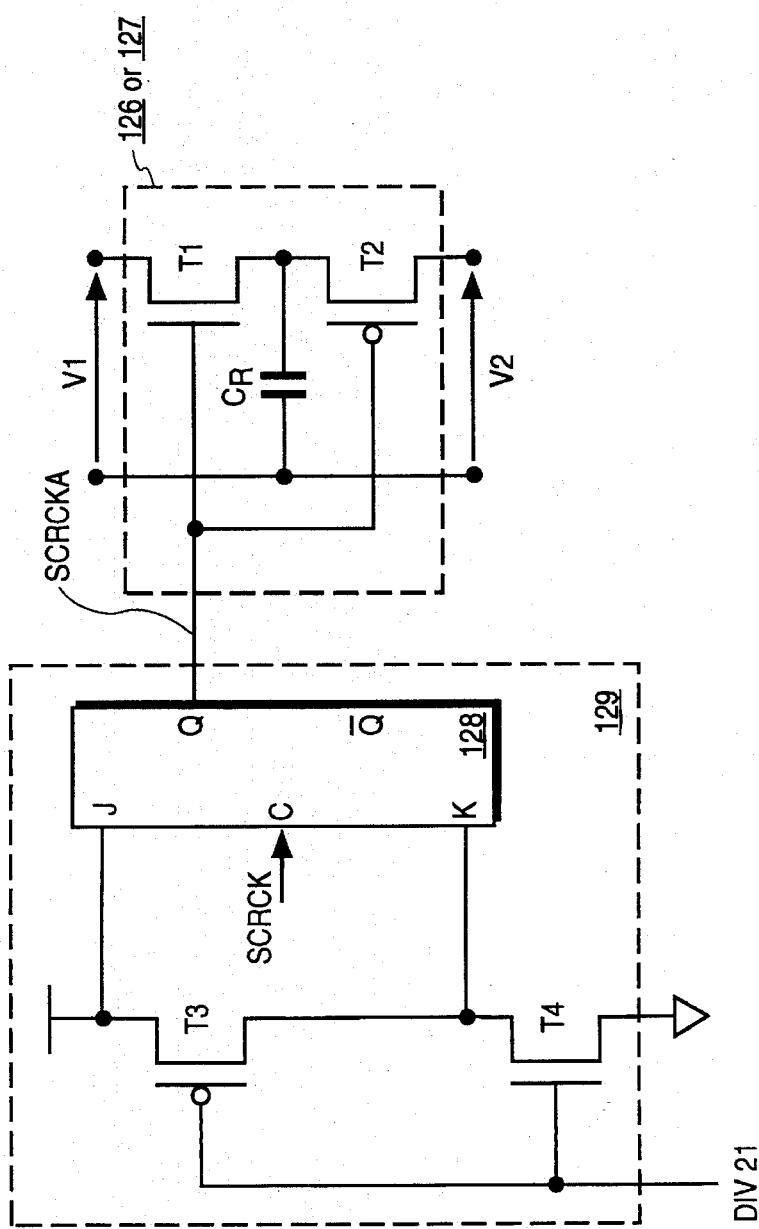
FIG. 6 shows a circuit for selectively changing the gain of a local processor adder.

FIG. 6 shows a circuit for controlling the effective resistance of switched capacitor register 126. The SCRCK clock signal is applied to J-K flip-flop (JKFF) 128 at the clock (C) input. The selective behavior of JKFF 128 is controlled by control signal DIV2I. When DIV2I is low, T3 is turned-on and T4 is turned-off, causing both the J and K inputs to be high which causes JKFF 128 to operate as a binary divider. The Q and $\overline{Q}$ outputs produce a clock signal with half the rate of SCRCK. The Q output is used to drive T1 and T2 of switched capacitor resistor to synthesize a resistor with a value of R. When DIV2I is high, T3 is open and T4 is turned-on causing K to be low and J to remain high, causing JKFF 128 to operate in a pass-through mode producing complementary Q and $\overline{Q}$ clock signals operating at the same rate as SCRCK and thus synthesize a resistor with a value of R/2.

By making the clock rate of SCRCK twice that of SCRCLK, the basic SCR clock, both resistor 126 and 127 values may be switched to provide constant gain for the partial cumulative value received from min/max selector 135 while providing a scale factor of ½ for $|u_i-v_j|$ when DIV2I is high and unity gain when DIV2I is low.

The means for scaling $D_k(i,j)$, the output of sample-and-hold circuit 150, is provided by field effect transmitter T6, as shown in FIG. 3(a). If the T6 gate signal DIV2I is low, T6 is open so that the feedback capacitance is capacitor 151 which has a value of C. The value $D_k(i,j)$ is stored as a charge, q, on capacitor 151 producing a voltage of q/C at the output terminal. If DIV2I is high, T6 conducts and connects a second capacitor (152) of value C in parallel with capacitor 151 changing the effective feedback capacitors to 2C. Consequently, the voltage at the output of op-amp 105 becomes halved (q/2C).

Thus, by binary scaling of the switched capacitor resistor clock rate the gain of the local distance term, $|u_i-v_j|$, may be halved while the binary scaling of the sample-and-hold capacitor of all node processors spanned by the elasticity parameter, 1, halves the relevant partial cumulatives, $\{D_k(i-1, j-1)\}$, so that properly scaled partial cumulatives are formed by the lattice.

Automatic scaling control can be initiated by means of scaling comparator 160 of FIG. 3(a). The positive (+) input of the comparator is connected to the output of adder 125 (or alternatively to the S/H 150 output). The other (−) input is connected to a reference voltage; VSCALE, that represents a threshold value which, if exceeded, results in a high likelihood of overflowing (or saturating) the adder to which its sum value is provided. By connecting DIV2O, the comparator 150 output, to DIV2I of clock divide network 129 (FIG. 6) of each node processor connected to its output, automatic scaling may be introduced. Alternatively, DIV2O can be connected to the DIV2I input of the clock divide network 129 of its own local node processor. In principle, the scaling would be applied only to those processors to which the detecting processor has its output connected. A reasonable scaling strategy would be to set VSCALE close to the maximum (saturation) value of adder unit 125 of node (i, j). When this value is exceeded, DIV2O may be used to interrupt the normal processing sequence and to initiate a set of scaling actions including:

1) halve the values of resistors 126 and 127 of all node processors in column j of all subsequent columns (j+1,j+2, . . .);

2) halve the output value of all prior partial cumulatives in the columns (j−1, j−2, . . . ) spanned by the elasticity parameter, 1;

3) record the nodes affected by the scale factors.

Alternatively, a lower threshold, say at one half of the saturation value, could be set. If this value of VSCALE is exceeded at node (i, j) the adder gains for the local distances of all processors in the subsequent columns (j+1, j+2, . . . ) would be halved and all S/H values of partial cumulatives, up to and including column j, that are spanned by the elasticity parameter from column j would be halved. This latter scaling strategy may not be as efficient as the former strategy described above.

Scale factors for each processor node may be recorded by adding an additional bit per local processor PISO=SR for recording the status of DIV2I, thus providing both scaling and track information when the PISO-SR is read out by the lattice controller.

Figure 7:
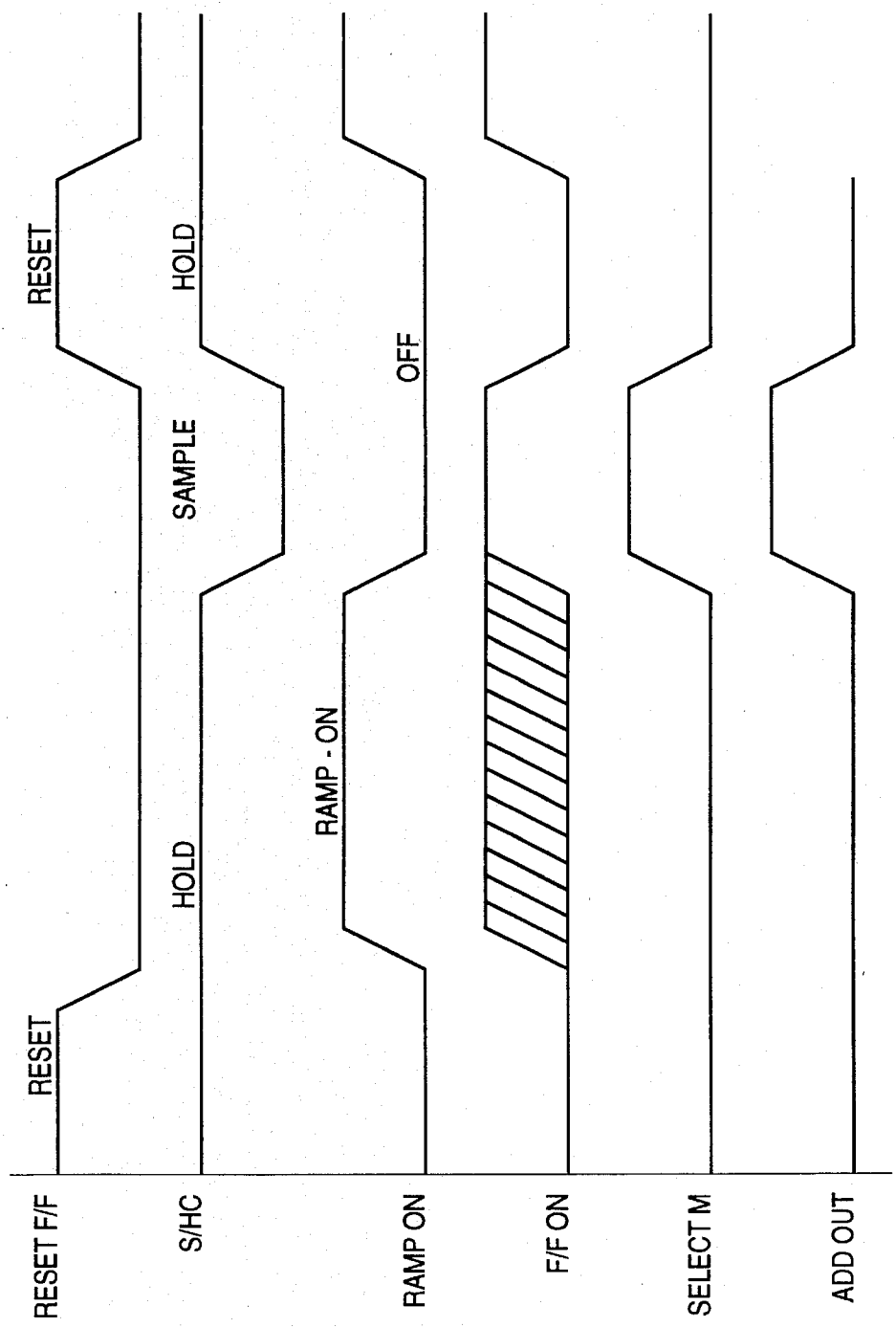
FIG. 7 is a timing diagram for the analog lattice node processor.

FIG. 7 is a timing diagram showing the control timing waveforms for operating lattice node processing unit 100. Each of the control timing waveforms are defined as follows:

RESET F/F: resets flip-flops 139 to low.

S/HC: controls sample and hold network 150.

RAMPON: indicates the intervals that the common ramp generator, externally provided, is on or off.

F/FON: if high, indicates when valid flip-flop 139 data exists. SELECTM: indicates when valid selection of $D_k(i-1, j-m)$ may be made through gates 1+0 of min/max selector 135.

ADDOUT: indicates when a valid address 125 output is available.

It should be noted that although the lattice node processor has been described as a mixed analog and digital network, an all digital implementation may also be used.

FIG. 8 shows a block diagram for a digital lattice node processing unit 100'. In this case, the preferred embodiment employs serial-binary processing units in order to minimize the number of traces within the chip, the silicon area required, and the number of interface pins.

Unit 110' is an absolute magnitude difference unit for generating the serial-binary encoded |u-v|. One possible implementation of which is shown in FIG. 9. Input $u_i$ is logically implemented by inverter 111 and then added, least significant bit (lsb) first, to $v_j$ by serial adder 112. The serial bit output stream from adder 112 is stored in serial-in shift register (SR) 113, lsb first. The most significant bit (msb) in SR 113 is used to indicate if an underflow occurred at the adder output (indicating $u_i > v_j$) and if so setting flip-flop (F/F) 114 as an lsb carry-in to serial carry-in adder 115. The SR 113 has one more bit (msb) than the two operands but, after carry-in adder 115, the extra bit is discarded.

Figure 10:
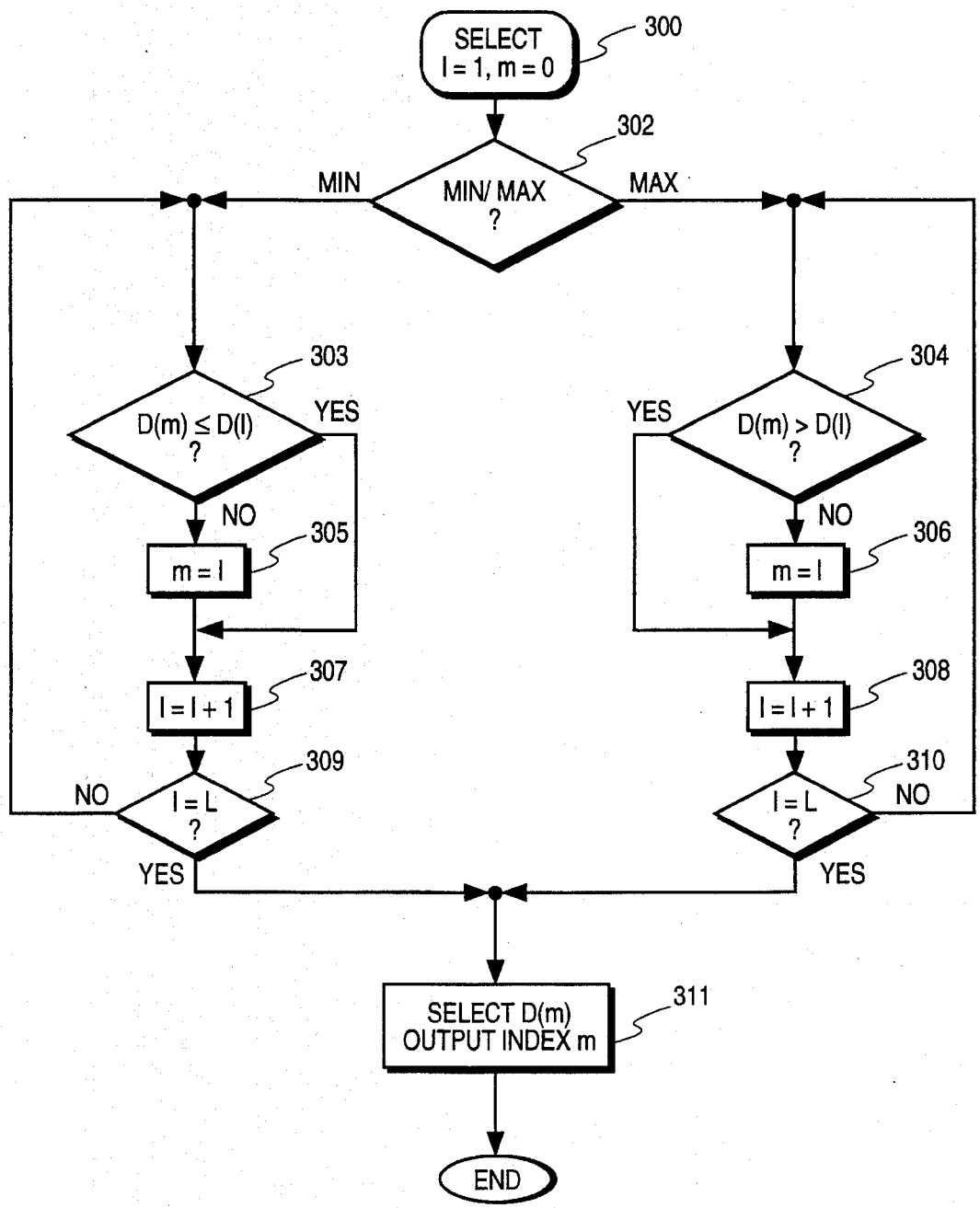
FIG. 10 is a flow diagram for a digital minimum selector unit operation.

Min/max selector 135' may be implemented as a one-for-one digital equivalent of selector 135 of FIGS. 2 and 4 by replacing analog comparators 136 with binary comparators and replacing the analog ramp at input 145 of FIG. 4 by a digital ramp. However, one preferred digital implementation may replace entire circuit 135 by a specialized selector processor, possibly shared by a number of nodes, that operates as shown in the flow diagram of FIG. 10.

The operation begins at step 300 where the data input channel index, 1, and min/max channel address number, m, are initialized to 1 and 0, respectively. Step 302 checks if a minimum (min) or maximum (max) has been selected, step 303 checks if $D(m) \leq D(1)$ and, if so, proceeds to step 307. Otherwise, step 305 sets m=l, replacing the previous candidate minimum D(m) by the current D(1). Step 307 increments index 1 and step 309 checks if all input channels have been examined and, if not, returns to step 303 for another interim. At step 311, the index m points to the minimum input value, D(m), which is made available to adder 125'.

If the max option is selected at step 302 the other (max) paralleled branch is followed (steps 304, 306, 308, 310) which is identical to the functions of the steps of the min branch excepts that step 304 asks if D(m) is greater than D(1). When step 311 is reached, the m index points to the input channel with the maximum value, D(m), present at input channel m. D(m) is made available to adder 125'.

The output of adder 125', $D_k(i,j)$, is stored in serial shift-register (SR) 121 where it is available as an output.

Other auxiliary functions, such as electing for possible (or probable) overflow and binary scaling in SR 121 are readily accomplished in the digital implementation. The use of a lattice column organized shift-register for storing the min/max index, m, and/or storing scaling flag DIV2O is the same as for the previously described analog case.

Figure 11:
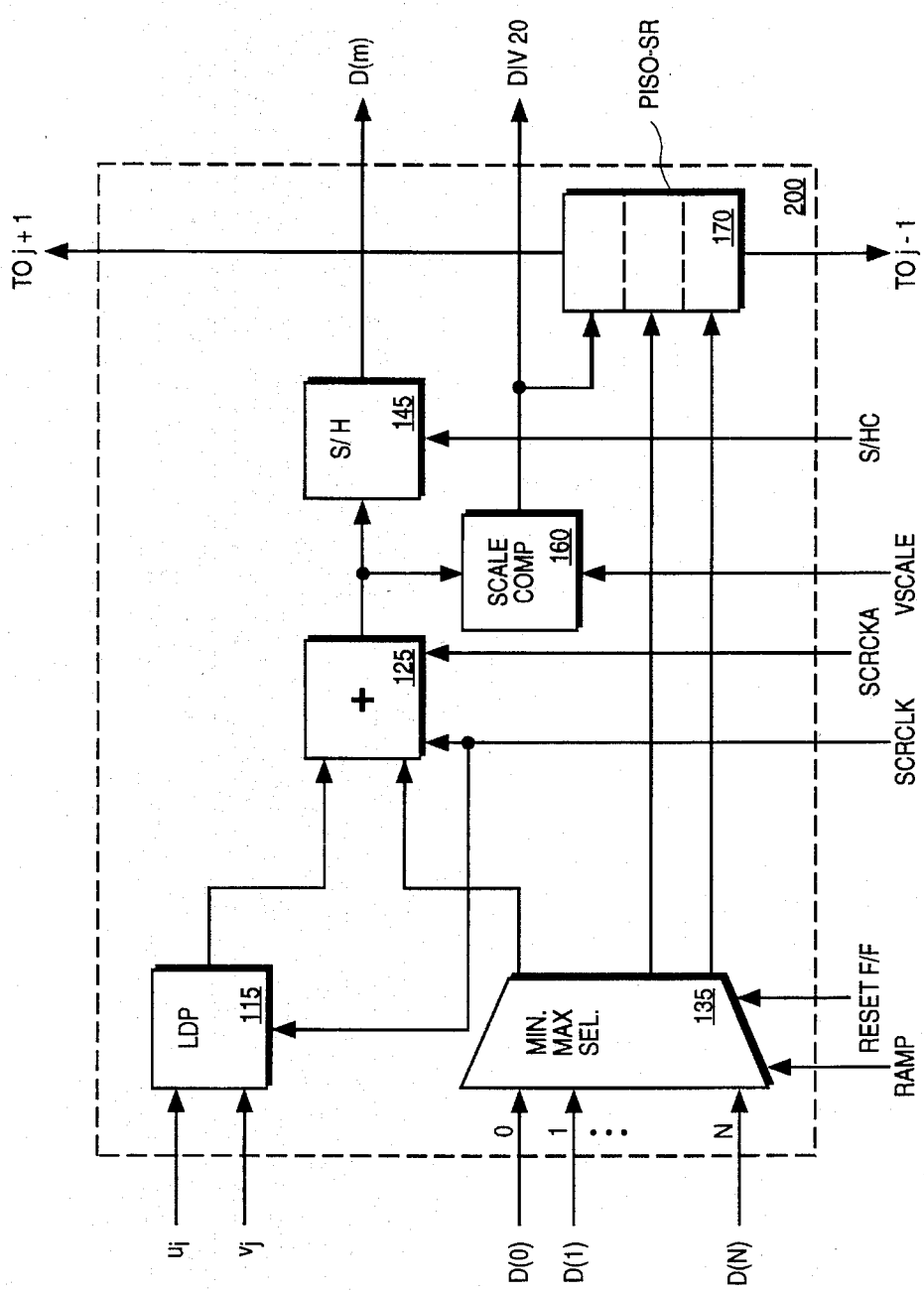
FIG. 11 shows the architecture of a lattice node processing unit.

FIG. 11 shows the architecture of a more complete DP lattice node processor 200 comprising the elements of FIG. 2 plus scaling comparator 160, PISO-SR 170, and input and output control signals. PISO-SR 170 is a parallel-in serial-out 3-bit (encoder 200) output and it is serially connected to PISO-SR units in adjacent lattice node processors. The tandem connection of PISO-SR units is for convenient serial access by the lattice controllers. (The clock-line for shifting and the control line for latching are omitted for improved clarity.)

Figure 12:
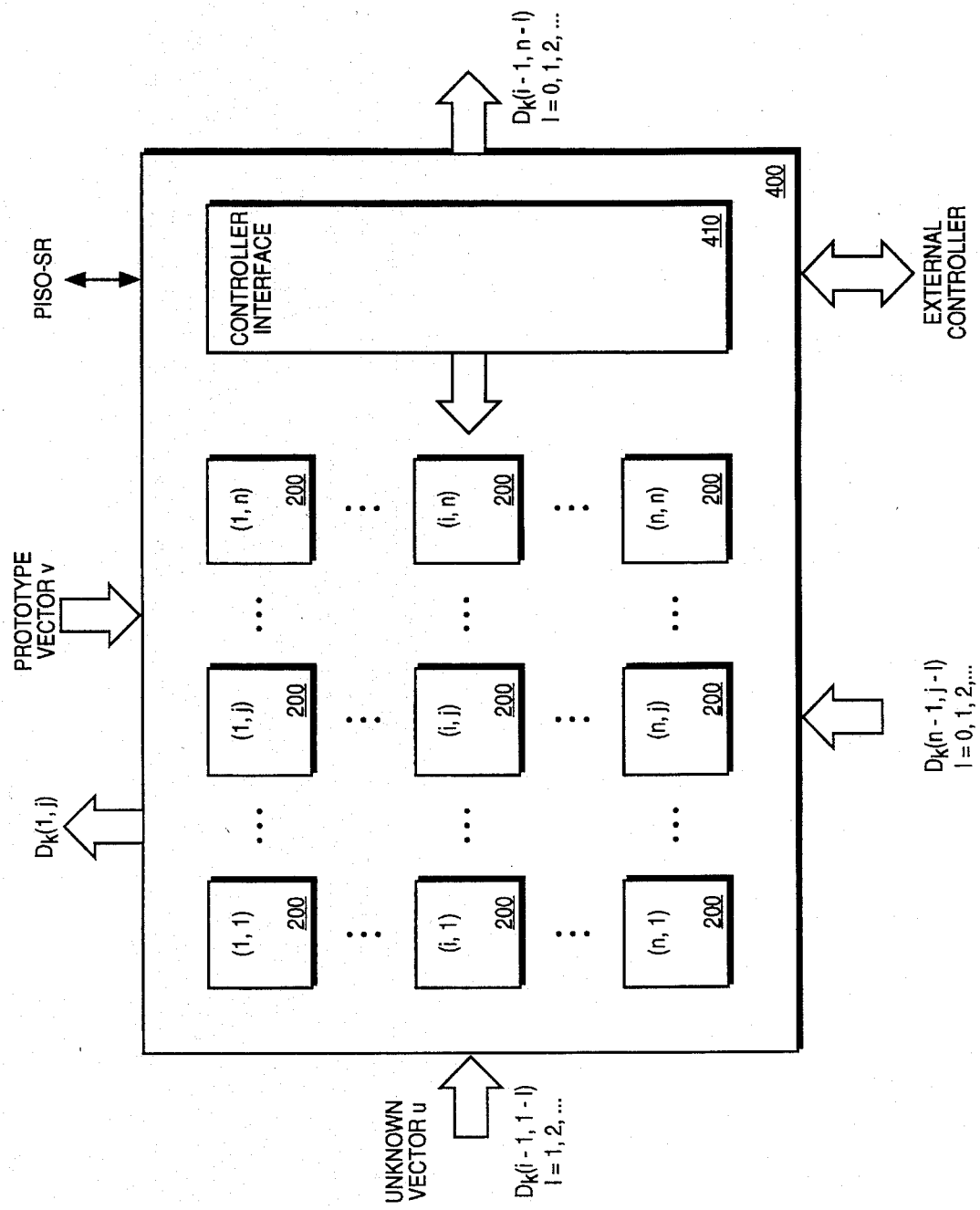
FIG. 12 shows the architecture of a DP lattice node chip.

FIG. 12 shows the architecture of a large scale integrated DP lattice chip 400 having a square array of $n^2$ nodal processor 200 circuits. The chip may be used as a modular building block for larger DP lattice structures.

DP lattice chips 400 provides for accepting data signals from units connected to the left (assuming a left-to-right wavefront flow). Left data inputs include the unknown vector $u=(u_1 u_2 \ldots u_n)^T$ and cumulative vector $D_k(i-1, 1-1)$, 1=1, 2, ... which provides left-to-right processing continuity.

Data may also flow from bottom-to-top. The DP lattice chip 400 that lies below provides the cumulative vector $D_k(n-1, j-1)$, 1=0, 1, 2...

Prototype vector v is input on the top of DP lattice chip 400 while the output processed cumulative vector is shown as $D_k(1,j)$ which may represent a final output or another intermediate cumulative vector.

On the right, cumulative vector $D_k(i-1, n-1)$, 1=0, 1, 2... , is available as an input to any DP lattice chips 400 that may be connected on the right.

Controller interface 410 generates and distributes the control signals needed for the operation of each of the $n^2$ lattice node processors 200 on the chip which include:

DIV2I: input scaling they received from the left adjacent chip is routed to the column of node processors 200 with index (1,1) through (n,1), if chip 400 is initialized for accepting scaling requests from the prior stage and, if not, the DIV2I input is ignored.

DIV2O: output scaling flag to the right adjacent chip.

PISO: input and output terminals for the internal serially connected set on $n^2$ 3-bit PISO-SRs used for the serial read-out of min/max path data and scale factors of each node processor 200.

SRCONT: input shift register controls for latching in scaling and min/max path data and for reading out shift register data.

IDIV2O: internally generated ORed DIV2O flag by each of the n-columns of node processors;

IDIV2I: response to IDIV2O or to the external DIV2I for controlling the binary scaling option selected.

RAMP: input of ramp from external source.

RESET: input for generating RESETF/F and all other initialization action on chip provides basic clock for generating S/HC.

SCRCK: input double frequency clock for driving SCRCKA generator 127 and generating SCRCLK on chip.

CONFG: input configuration enable from external source.

CONSCL: configuration input high indicates scale next right column, input low indicates scale same column.

CONMM: configuration input high indicates select max distance, low indicates select min distance operation of the min/max selector.

C. DP Classifier System

Figure 13:
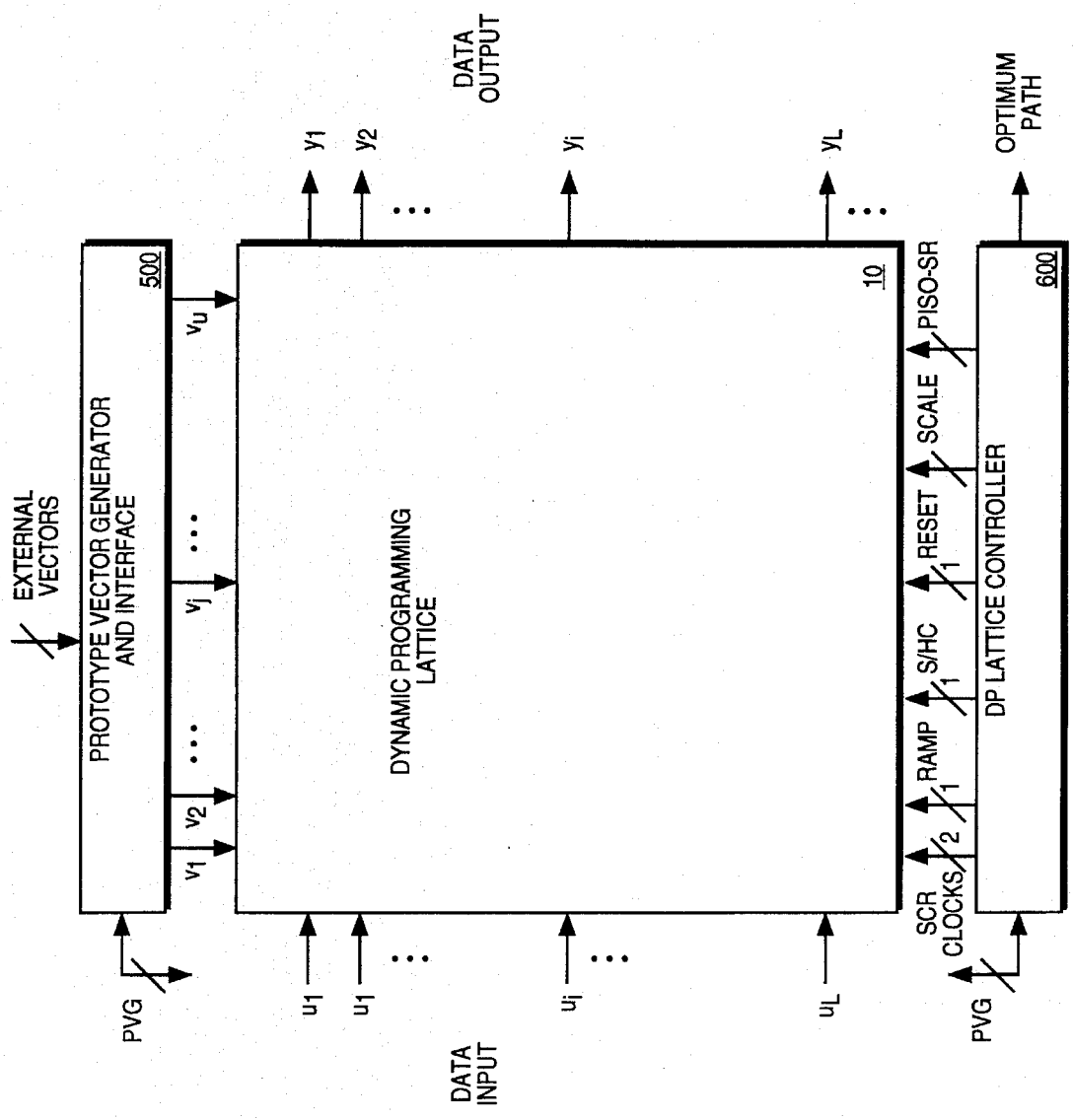
FIG. 13 is a block diagram of a DP lattice computing system.

FIG. 13 is a block diagram of a lattice-based DP classifier system comprising: a lattice network 10 made up of interconnected DP lattice chips 400; a DP lattice controller 600; and a prototype vector generator/interface unit 500.

Lattice network 10 consists of L rows and M columns of DP lattice chips 400. Input terminals are provided to accept an L element unknown vector, $u=(u_1 u_2 \ldots u_L)^T$ and a M element prototype vector, $v=(v_1 v_2 \ldots v_m)^T$. It produces an L element output vector, $Y=(Y_1 Y_2 \ldots Y_L)^T$.

Prototype vector generator 500 provides the required prototype vectors either from an internal store or from an external source. In the one-shot mode the prototype vector, u, is applied to all M input terminals and the result, y, is obtained at the data output terminals after sufficient time for the wavefront to pass (left-to-right) through DP lattice 10.

Because the partial cumulative values previously computed beyond the range of the elasticity parameter, 1, are not required for computing later cumulative values, and because the min/max path tracks have been recorded in the PISO-SR units associated with each nodal processor, by reading-out the path track pointers and storing their values in a local controller memory for later use, the nodal processors become available for initiating another (pipelined) process using a new unknown and/or prototype vector.

It is also possible to operate the DP lattice network in a cylindrical or recursive mode in which the j-dimension of the lattice network is made equal to the span of the maximum, L, of the elasticity parameter, 1. Thus, if the unknown vector, u, was of dimension M, the DP lattice would be of dimensions M×L. Conceptually the output of the last, $L^{th}$, column is fed back to the input column forming a cylindrical lattice network.

Figure 14:
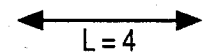
FIG. 14 is a tabular representation of the cylindrical operating mode for L=4.

FIG. 14 is a tabular representation of the cylindrical mode operation when L=4. The first column is the beginning time for each row. Each row has L entries representing the L columns of the DP lattice network. The number in the column of each row represents the j-column index indicating that at time index, n=0, for example, the j=0 column of the DP lattice begins calculating the set of cumulatives, $\{D_k(i,0)\}$. At n=1, the j=1 column starts calculating the set $\{D_k(i,1)\}$, and so on. At n=L=4, the j=0 column of the DP lattice accepts a new prototype vector component, $v_4$, while for columns 1, 2, 3 prototype vector components $v_1$, $v_2$, and $v_3$ are used, respectively. In this manner, the prior L−1=3 partial cumulatives are available for calculating the set $\{D_k(i,4)\}$. After another time interval of one time unit (n=5), column j=1 is assigned to computing the set $\{D_k(i,5)\}$ using prototype vector component $v_5$ and the previously calculated cumulatives. This process continues for as long as necessary to exhaust all component values of a given prototype vector. The timely storing of the PISO-SR information by the controller allows the optimum path to be established.

Figure 15:
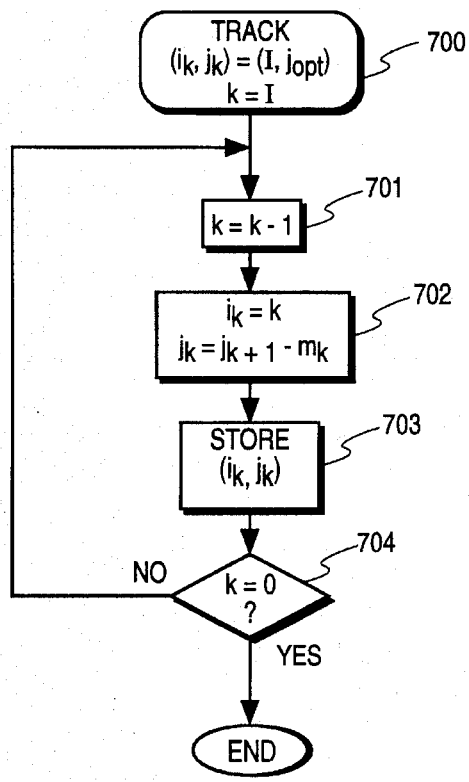
FIG. 15 is a flow diagram of the procedure for determining the optimum track through the lattice.

FIG. 15 is a flow diagram for determining the min/max track through the lattice that optimizes the minimum or maximum distance between the unknown vector and the prototype vector. The procedure, TRACK 700, is used after processing the two vectors. The unknown vector, u, is assumed to have I+1 components $(u_0 u_1 u_2 \ldots u_I)$ while the prototype vector, v, is assumed to have J+1 components $(v_0 v_1 v_2 \ldots v_J)$.

Process 700 begins with the coordinates of the min/max value at $(i_k, j_k)=(I, j_{opt})$, and index k=I. Step 701 decrements k, and the coordinates of the next lower optimum node $(i_{k-1}, j_{k-1})$ are found in step 702 by subtracting the offset index $m_k$, generated by the min/max selector 135 of node $(i_k, j_k)=(I, j_{opt})$, from $j_{k+1}$. The new found coordinates $(i_k, j_k)$ are stored in the controller 600 memory. Test step 704 checks if all levels of index i have been exhausted and, if so, ends the process. If k≠0, the process returns to step 701 for another iteration. When the process is completed, the set of coordinates, $\{(i_k, j_k)\}$, obtained describe the track of the optimum path through the lattice.

Figure 16:
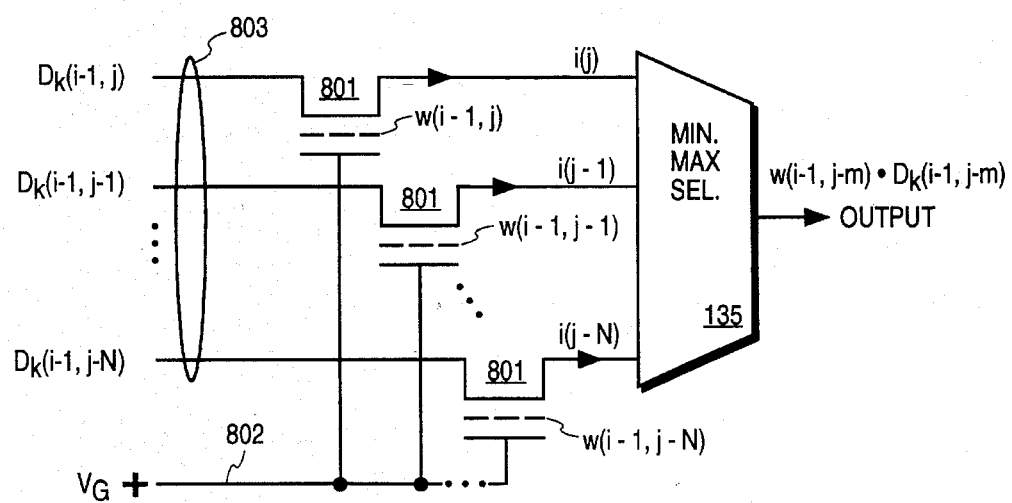
FIG. 16 shows the use of flash floating gate transistors as interconnection weights.

Path-dependent DP recursions take the form $$\{D_k(i,j) = d_k(i,j) + \min/\max_{l} \{w(i-1, j-1) \cdot D_k(i-1, j-1)\} \quad (6)$$

where w(i−1, j−1) is a scaling weight applied to the partial cumulative, $D_k(i-1, j-1)$, received from the node at (i−1, j−1). These weights could be applied in min/max selector 135 or as part of the connections. FIG. 16 shows a method for introducing the weights by adding additional circuitry at the input of max/min selector 135.

The partial cumulatives, $\{D_k(i-1, j-1)\}$, are supplied on input terminals 803. Each input line has a flash floating gate (EEPROM) transistor 801 connected in series with the incoming cumulative signal. The programmed charge on the floating gate controls the drain to source conductance in proportion to the stored weights. In this way, the current, i(j−1), flowing into min/max selector 135 can be made proportional to the product $w(i-1, j-1)D_k(i-1, j-1)$. The gate voltage needed for conductance control of the flash EEPROMs 801 is supplied by $V_G$ on input 802.

Alternatively, "on-off" connections between nodal processors could be established either by the use of the programmable floating gates (EEPROM) described above or by means of fusible links that would provide means for selectively "opening" connections corresponding to a w(i,j)=0.

An additional embodiment of the local node processor 100 of FIG. 2 obtains when local processor is replaced by a conditional probability generator that accepts the vector pair $(u_i, v_j)$ and generates a value representative of $p(v_k|u_i)$, the probability of element $v_k$ given unknown element $u_i$. Such a probability function could be used in the computation of hidden-Markov-models (HMMs). For example, a local distance processor could generate a value proportional to $e^{-c|u_i-v_j|}$ or $e^{-c|u_i-v_h|^2}$ by first forming $c|u_i-v_j|$ or $c|u_i-v_j|^2$, where c is a scaling factor, and then exponentiating. Methods and apparatus for these types of nonlinear operations are well known in the art. For example, see "Nonlinear Circuits Handbook." Edited by Sheingold, D. H., Analog Devices, Inc., Norwood, Mass. 1976.

The output of the DP lattice network is obtained at the output of the nodal processors located at coordinates (i,j)= (I,j) where I is the highest value of index i (implying a I+1 element input vector, u). The set of final cumulatives, $\{D_k(I,j)\}$, represents the cumulative distances between vectors u and v. The optimum $D_k(I,j_{opt})$, i.e. either the maximum or minimum, at coordinates $(I,j_{opt})$ represents the terminus of the optimum path. By applying the TRACK algorithm of FIG. 15, the optimum path associated with the terminal coordinates may be established by back-tracking through the network finally ending at a node $(0,j_0)$ where $0 \leq j_0 \leq J$ and J+1 is the number of elements in the prototype vector, v.

Figure 17:
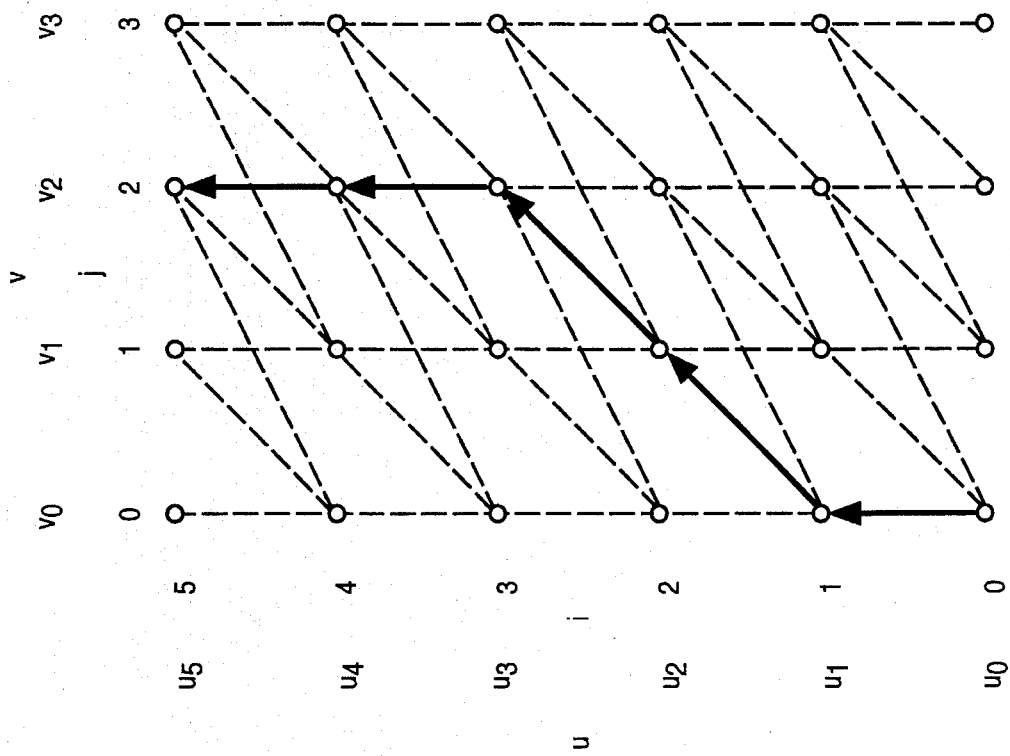
FIG. 17 shows an example of an optimum path for a 6×4 DP lattice network.

For example, consider the DP lattice network flow-graph of FIG. 17 for a six element unknown vector, u, and a four element prototype vector, v. The elasticity parameter, 1, is assumed to have a range of $0 \leq 1 \leq 2$. The dotted lines between nodes represent the possible track segments, all flowing upward and to the right. The optimum path is represented by the solid segments which, for this example, terminate at coordinates (i,j)=(5,2). The TRACK procedure 500 establishes the path to be represented by the set of associated optimum nodes as (0,0), (1,0), (2,1), (3,2), (4,2), and (5,2).

In a classification system using a minimum distance (difference) criteria, i.e., minimim of $\{D_k(i-1, j-1)\}$ with respect to 1, the above set of optimum path coordinates have the following interpretation:

| Coordinates | Interpretation |
| --- | --- |
| (0,0) | $u_0$ is closest to $v_0$ |
| (1,0) | $u_1$ is closest to $v_0$ |
| (2,1) | $u_2$ is closest to $v_1$ |
| (3,2) | $u_3$ is closest to $v_2$ |
| (4,2) | $u_4$ is closest to $v_2$ |
| (5,2) | $u_5$ is closest to $v_2$, and $D(5,2)$ is the optimum (min) distance between u and v |

Note that the optimum path does not, in this example, include a "match" between any $u_i$ and $v_3$ whereas a sub-optimum path may.

Typically, an unknown input vector is compared against a set of possible prototypes as, for example, in a vector quantization (VQ) system in which the unknown vector is "quantified" by assigning to it the code index associated with the closest prototype vector in the code book. The code book is the set of indexed prototype vectors.

The optimum path provides additional information. For example, the absence of a match between any element of the unknown and a prototype, or multiple matches between elements of the unknown and prototype may, or may not, be statistically significant. For example, an elongated phoneme in a speech classifier may not be significant if the speech is over-sampled.

Figure 18:
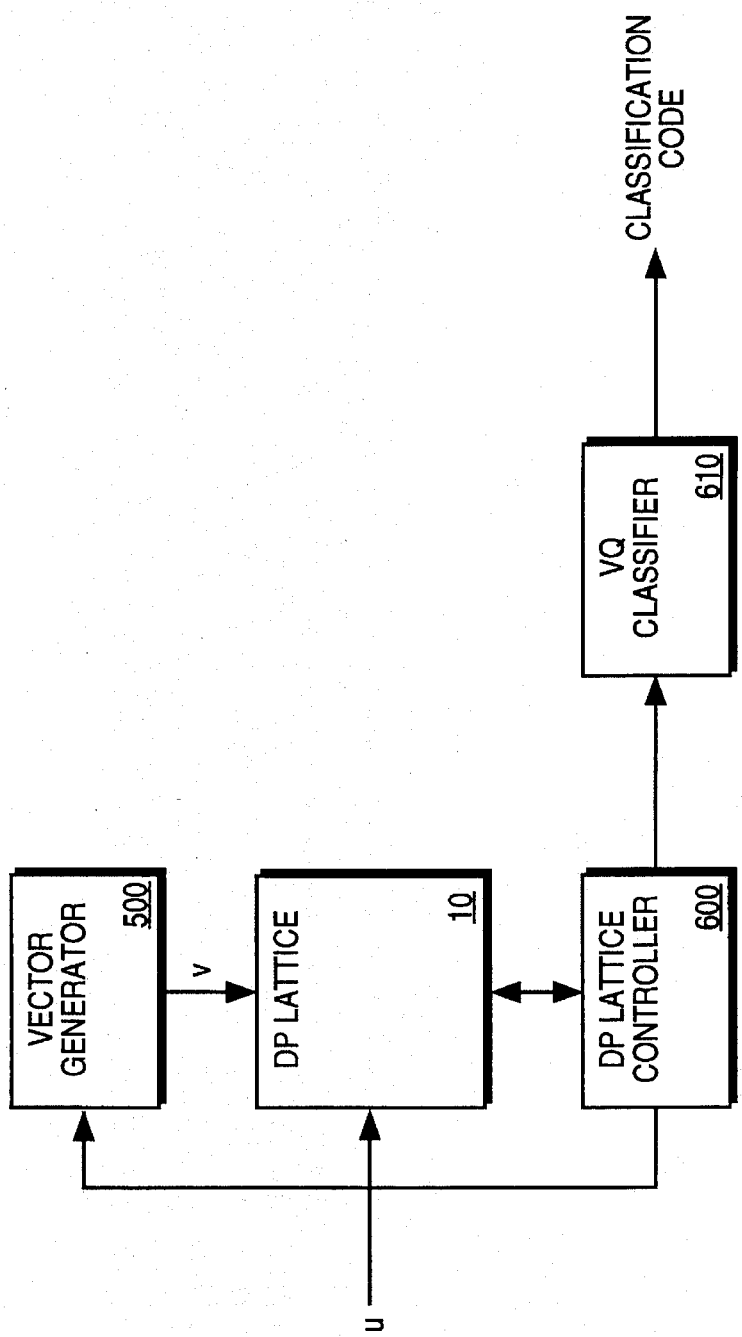
FIG. 18 is a block diagram of a DP lattice-based vector quantization classifier.

FIG. 18 shows a complete DP lattice based classifier comprising a controller 600 that includes memory and CPU, vector generator 500 controlled by controller 600 for providing a set of prototype vectors which are to be matched against an unknown input vector, u, by DP lattice 10. The output of DP lattice 10 is a set of cumulative total distances $\{D_k(I,j)\}$, scaling factors, and optimum elasticity parameter offsets, from which DP lattice controller selects the appropriate cumulative distance values and associated tracks that are supplied as feature vectors to vector quantizer (VQ) 610. VQ 610 outputs a code corresponding to the best match between the vector u and the set of prototypes, {v}, based on a pre-programmed selection criteria. In the simplest case, VQ 610 simply selects the optimum (minimum or maximum) cumulative total distance from the observed responses to the set of prototype vectors.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiments are not intended to limit the scope of the claims which in themselves recite only those features regarded as essential to the invention.

What is claimed is:

1. A lattice-based dynamic programming (DP) classification system that compares an unknown vector with a prescribed set of prototype vectors comprising:

a) a lattice controller for system control, for system configuration, for selecting a prescribed prototype vector for comparison with the unknown vector for storing of processed results of a DP lattice network, for determining an optimal lattice path, and for determining an optimal cumulative distance value corresponding to the optimal lattice path;

b) a DP lattice network controlled by the lattice controller for producing processed results by use of processing means operating on the prescribed prototype vector and the unknown vector, the processing means comprising means for computing a cumulative distance between the unknown vector and a prototype vector, means for providing optimal path information to the lattice controller, a first set of input terminals for accepting the unknown vector, a second set of input terminals for accepting a prototype vector, a set of processed data output terminals for outputting the processed results, and a set of control terminals connected to the lattice controller for transmitting controlled lattice path information;

c) a vector generator controlled by the lattice controller comprising means for generating at the vector generator output terminals a prototype vector selected from the prescribed set of prototype vectors, the output terminals connected to the second set of the DP lattice network input terminals; and d) a vector quantizer (VQ) comprising a VQ code book of prescribed prototype vectors, with the VQ data input connected to the lattice controller for classifying the unknown vector based on the optimal lattice path by outputting a VQ code corresponding to a prescribed prototype vector that most closely corresponds to the unknown vector.

2. The system of claim 1, wherein the DP lattice network comprises a MXN array of nodal processors, a first set of M input terminals for accepting an unknown vector with M vector components, a second set of N input terminals for accepting a prescribed prototype vector with N vector components, each nodal processor of the MXN array of nodal processors is identified by coordinates (i,j), where $0 \leq i \leq (M-1)$ is a row index and $0 \leq j \leq (N-1)$ is a column index, wherein the nodal processor, identified by coordinate indices (i,j), for processing the $i^{th}$ unknown vector component and the $j^{th}$ prototype vector component further comprises:

a) an output terminal for outputting the nodal processor output of a cumulative distance value;

b) an input terminal for inputting the $i^{th}$ component of the unknown vector from the first set of M input terminals;

c) an input terminal for receiving the $j^{th}$ component of the prescribed prototype vector from the second set of N input terminals;

d) a local distance processor unit for calculating, and producing, at an output terminal, a distance metric representative of an absolute difference between the $i^{th}$ unknown vector component and the $j^{th}$ prescribed prototype vector component;

e) a comparator/selector unit having a multiplicity of input terminals, each input terminal connected to a distinct nodal processor output signal of a nodal processor identified by coordinate indices (i–1, j–1) for $\geq 0$, the comparator/selector unit for comparing the output signal of each nodal processor and selecting for output at an output terminal the input terminal with a nodal processor output signal satisfying an optimality criterion; and f) an adder unit with an output, a first input connected to the output terminal of the local distance processor, and a second input connected to the output terminal of the comparator/selector unit, the adder unit output connected to the nodal processor output terminal for producing at the adder unit output a signal representative of a cumulative distance measure of the (i, j) nodal processor.

3. The system of claim 2 wherein the nodal processor further comprises a storage means at the adder unit output for storing the adder unit output signal representative of a cumulative distance and operating under control of the lattice controller.

4. The system of claim 2 wherein the nodal processor further comprises:
   a) an encoder network for generating a binary coded signal identifying the nodal processor whose output was selected by the comparator/selector unit: and
   b) a storage unit whose content is addressable by the lattice controller for temporarily storing the binary coded signal generated by the encoder network for use by the lattice controller in establishing the optimal lattice path.

5. The system of claim 4 wherein the storage unit is a parallel-in serial-out shift register.

6. The system of claim 2, wherein the nodal processor further comprises:
   a) binary gain scaling means controlled by the lattice controller, the binary gain scaling means for scaling the output of the nodal processor;
   b) saturation detection means coupled to the output terminal of the nodal processor, having a threshold value that is compared with the nodal processor output, the saturation detection means for producing a scaling request signal at the saturation detection means output if the threshold value is exceeded; and
   c) a storage means for temporary storing the scaling request signal, the storage means being accessible for reading by the lattice controller.

7. The system of claim 2 wherein the prescribed optimality criterion selects the input terminal having a smallest nodal processor output signal.

8. The system of claim 2 wherein the prescribed optimality criterion selects the input terminal having a largest nodal processor output signal.

9. The system of claim 2 wherein the comparator/selector unit further comprises means for selecting a first or a second optimality criteria, the first optimality criteria for selecting the input terminal having a smallest nodal processor output signal, and the second optimality criteria for selecting the input terminal having a largest nodal processor output signal.

10. The system of claim 1, further comprising a lattice controller for controlling means, for scaling intermediate lattice network results and for expanding the dynamic range of the lattice network.

11. The system of claim 10 wherein the lattice controller applies binary scaling to the nodal processor output of each nodal processors connected to a prescribed prototype vector component with prototype index less than j, and applies binary scaling to the output of each adder unit in nodal processors connected to a prototype vector component with prototype index equal to and greater than j, whenever the lattice controller senses a scaling request indicator in any processor having a prototype index of j.

12. A modular chip large-scale integrated circuit, lattice-based dynamic programming nodal processor array for use in a vector classification system, the modular chip comprising:
   a) a set of M-input terminals, indexed $1 \leq i \leq M$, for inputting an M-component unknown data vector;
   b) a set of N-input terminals, indexed $1 \leq j \leq N$, for inputting an N-component prototype data vector;
   c) a set of N-output terminals for outputting an N-component cumulative distance vector;
   d) a set of lattice controller terminals for receiving control and configuration signals from a lattice controller and for sending status signals to a lattice controller;
   e) a controller interface connected to the set of lattice controller terminals, the controller interface for formatting and sending status signals to a lattice controller, for generating and distributing control signals to on-chip nodal processors; and
   f) a lattice network having MXN nodal processors, each nodal processor indexed by a two-dimensional coordinate index (i,j) where index $1 \leq i \leq M$ corresponds to the $i^{th}$ component of the M-component unknown data vector, and index $1 \leq j \leq N$ corresponds to the $j^{th}$ component of the N-component prototype data vector, the (i,j) nodal processor comprising:
      i) an output terminal for outputting a cumulative distance output signal;
      ii) a first input terminal connected to the $i^{th}$ terminal of the set of M-input terminals;
      iii) a second input terminal connected to the $j^{th}$ terminal of the set of N-input terminals;
      iv) a local distance processor connected to the first input terminal and to the second input terminal, the local distance processor for producing at an output terminal a distance metric representative of the distance between the $i^{th}$ unknown vector component and the $j^{th}$ prototype vector component;
      v) a comparator/selector circuit having a multiplicity of input cumulative distance terminals connected to the output terminal of a set of lower-order nodal processors having an unknown vector component index of i−1 and prototype vector component indices equal to (j−l) for $0 \leq l \leq L$ where L represents a prescribed limit of elasticity, and an output data terminal, the comparator/selector circuit for presenting at the output data terminal a lower-order input cumulative signal distance corresponding to a smallest value of the set of lower-order processor output signals;
      vi) an adder circuit with a first input connected to the local distance processor output terminal, a second input connected to the output data terminal of the comparator/selector circuit for producing at the adder circuit output a sum signal combining a signal from the first input and a signal from the second input, the sum signal being the (i,j) nodal processor output cumulative distance signal; and
   g) each (M,j) nodal processor adder circuit output connected to the $j^{th}$ terminal of the set of N-output terminals.

13. The integrated circuit of claim 12 wherein each adder circuit further comprises means for indicating potential overflow by comparing the adder circuit output sum signal with a programmable threshold value and, if the threshold value is exceeded, generating a scaling request signal for use by an external controller.

14. The integrated circuit of claim 13 wherein each nodal processor further comprises:
   a) a local distance processor binary scaling means connected to the local processor output terminal for binary scaling of the distance metric and connected to the lattice controller terminals for control by a lattice controller; and
   b) a nodal processor output binary scaling means connected to the nodal processor output for binary scaling the (i j) cumulative distance signal, and connected to the lattice controller terminals for control by a lattice controller.

15. The integrated circuit of claim 14 further comprising temporary memory means for storing a scaling indicator signal indicating a binary scaling value of both the local distance processor and the nodal processor output, the temporary memory means connected to the set of lattice control terminals for read access by an external controller.

16. The integrated circuit of claim 15 wherein the temporary memory means is a parallel-in serial-out shift register.

17. The integrated circuit of claim 12 wherein the comparator/selector circuit further comprises means for identifying and encoding the input cumulative distance terminal of the multiplicity of cumulative distance terminals selected, and temporary storage means connected to the set of lattice control terminals for read access by an external controller for temporarily storing the encoded identification of the selected input terminal for use in establishing an optimal path through the lattice network.

18. The integrated circuit of claim 17 wherein the temporary storage means is a parallel-in serial-out register.

19. The integrated circuit of claim 12 further comprising a controller interface network for exchanging control information and signals with an external controller.

20. The integrated circuit of claim 19 wherein the controller interface further comprises means for generating and distributing, within the modular chip large-scale integrated circuit a switched-capacitor-resistor clock for binary gain control, the switched capacitor resistor clock from a clock signal provided by an external controller.

21. The integrated circuit of claim 12 further comprising externally controllable gates for opening and closing internodal processor connections.

22. The integrated circuit of claim 21 wherein the externally controllable gates are field effect transistors.

23. The integrated circuit of claim 21 wherein the externally controllable gates are floating gate transistors with selectively pre-programmed stored charges for controlling the floating gate transistor drain to source conductance to act as an interconnection weight.

24. The integrated circuit of claim 12 further comprising means for converting the (i, j) nodal processor output cumulative distance signal into a conditional probability value representing a probability of the $j^{th}$ prototype vector element given an $i^{th}$ unknown vector element.

25. The modular chip of claim 12 with auxiliary input and output terminals for interconnecting similar modular chips into a P×Q chip-array that can operate on an unknown vector with P·M elements and a prototype vector with Q·N elements, a prescribed elasticity limit of L prior nodal processor cumulative distance output signals, the modular chip further comprising:

(a) a first set of cumulative distance input terminals for each of M rows of nodal processors with L-(j-1) terminals connected to the input cumulative distance terminals of the $j^{th}$ nodal processor, where $1 \leq j \leq L$, for each of M rows;

(b) a second set of (N+L-2) with cumulative distance input terminals, indexed k through k+L-1, connected to distinct input cumulative distance terminals of each nodal processor at coordinates (i,j)=(1,k+1); and (c) a first set of L cumulative distance output terminals for each of M rows of nodal processors, each cumulative output terminal connected to a distinct nodal processor output located at coordinates (i,j)=(i,N-l) for $0 \leq l \leq L-1$.

* * * * *

UNITED STATES PATENT AND TRADEMARK OFFICE
CERTIFICATE OF CORRECTION

| | | |
|---|---|---|
| PATENT NO. | : | 5,473,731 |
| DATED | : | December 5, 1995 |
| INVENTOR(S) | : | Daniel Seligson |

It is certified that error appears in the above-identified patent and that said Letters Patent is hereby corrected as shown below:

In column 6 at line 21 delete "$\bar{s}_2$" and insert --$\bar{x}_2$--

In column 6 at line 55 delete "$(Y_0 \ \bar{y}_1 + \bar{y}_0 \cdot y_1)$" and insert --$(\bar{y}_0 \cdot y_1 + y_0 \cdot \bar{y}_1)$--

In column 12 at line 19 delete "w(i-1,j-1)D$_K$(i-1,j-1)." and insert
-- w(i-1,j-l)D$_k$(i-l,j-l) --.

In column 12 at line 35 delete "$v_h$" and insert --$v_j$--

In column 17 at line 22 delete "serial-out register." and insert --serial-out shift register--

Signed and Sealed this

Eleventh Day of February, 1997

Attest:

BRUCE LEHMAN

*Attesting Officer*   *Commissioner of Patents and Trademarks*